(12) United States Patent
Ockenden

(10) Patent No.: US 6,554,307 B1
(45) Date of Patent: Apr. 29, 2003

(54) BICYCLE DROPOUT FRAME MEMBER

(75) Inventor: Lynn Marie Ockenden, Minneapolis, MN (US)

(73) Assignee: Transbike Systems, Inc., Columbia Heights, MN (US)

( * ) Notice: Subject to any disclaimer, the term of this patent is extended or adjusted under 35 U.S.C. 154(b) by 0 days.

(21) Appl. No.: 09/356,135

(22) Filed: Jul. 17, 1999

Related U.S. Application Data

(63) Continuation-in-part of application No. 09/127,049, filed on Jul. 31, 1998.

(51) Int. Cl.[7] ............................................. B62K 27/00
(52) U.S. Cl. ................................................... 280/204
(58) Field of Search ........................ 280/202, 204, 280/304.5, 288.4, 292, 495, 504, 203, 492, 503, 240, 281.1; 180/205

(56) References Cited

U.S. PATENT DOCUMENTS

| | | | |
|---|---|---|---|
| 2,583,550 A | | 1/1952 | Dennis |
| 2,755,103 A | * | 7/1956 | Douglas .................. 280/281.1 |
| 3,795,354 A | | 3/1974 | Stippich |
| 3,827,613 A | | 8/1974 | Meyer |
| 4,023,820 A | | 5/1977 | Rizzo |
| 4,328,915 A | | 5/1982 | Melton |
| 4,342,467 A | | 8/1982 | Kester |
| 4,418,850 A | | 12/1983 | Jackson |
| 4,440,331 A | | 4/1984 | Schimmels |
| 4,577,786 A | | 3/1986 | Dowrick |
| 4,690,420 A | | 9/1987 | Belka |
| 4,721,320 A | * | 1/1988 | Creps et al. ................. 280/204 |
| 4,883,283 A | | 11/1989 | Hazelett |
| 4,928,985 A | | 5/1990 | Nowlin |
| 5,039,120 A | | 8/1991 | Stowe |
| 5,090,717 A | | 2/1992 | Belka |
| 5,240,266 A | | 8/1993 | Kelley |
| 5,332,134 A | | 7/1994 | Chen |
| 5,395,130 A | | 3/1995 | Rubin |
| 5,410,893 A | | 5/1995 | Easterwood |
| 5,470,088 A | | 11/1995 | Adams |
| 5,470,092 A | | 11/1995 | Fardy |
| 5,542,587 A | * | 8/1996 | Broz et al. ............... 280/202 X |
| 5,588,661 A | | 12/1996 | Wolfe |
| 5,842,535 A | * | 12/1998 | Dennis ........................ 180/205 |
| 5,975,549 A | * | 11/1999 | Ockenden ................... 280/240 |

FOREIGN PATENT DOCUMENTS

| | | |
|---|---|---|
| DE | 4101745 A1 * | 7/1992 |
| DE | 4416124 A1 * | 11/1995 |

* cited by examiner

Primary Examiner—Christopher P. Schwartz
Assistant Examiner—Melanie Torres
(74) Attorney, Agent, or Firm—Moore & Hansen

(57) ABSTRACT

An improved bicycle dropout frame member for simultaneously mounting a plurality of accessories such as panniers, baskets, trailer hitch and trailer, luggage carrier, wheel fender, etc. to a bicycle frame is disclosed. The improved bicycle dropout may include one or more mounting studs for releasably receiving accessory support legs. The central body may also include a bore for receiving a towing hitch apparatus to enable a rider to tow a trailer behind the bicycle incorporating the improved bicycle dropout frame member of the present invention.

19 Claims, 16 Drawing Sheets

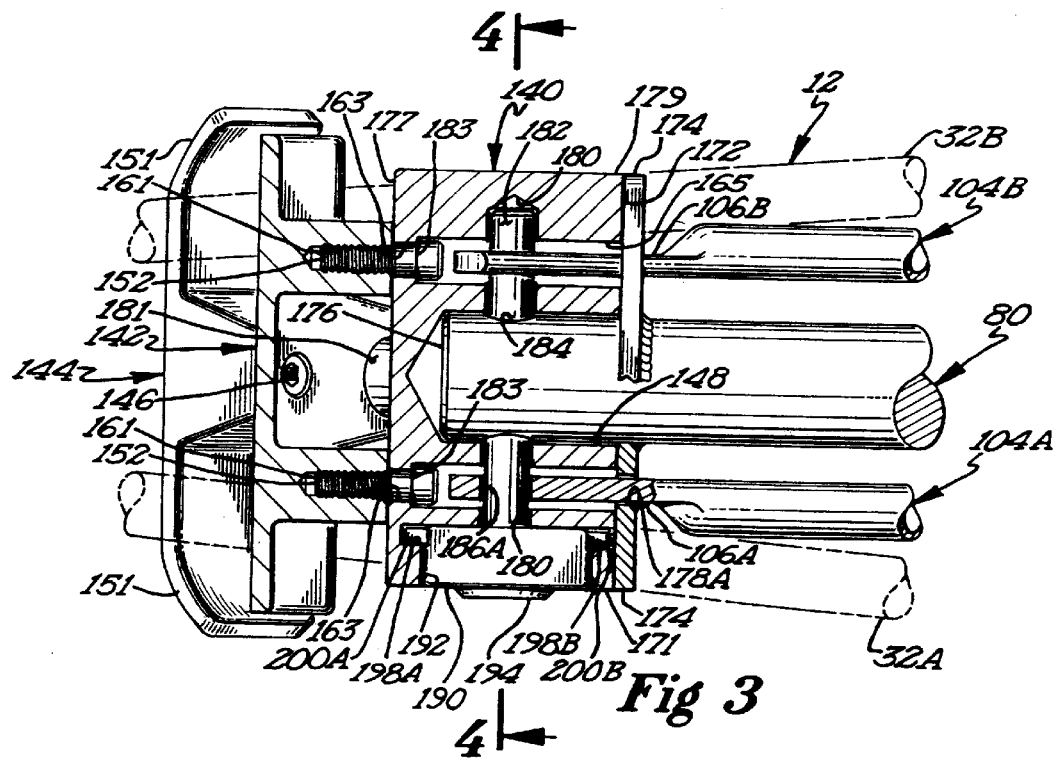
Fig 3
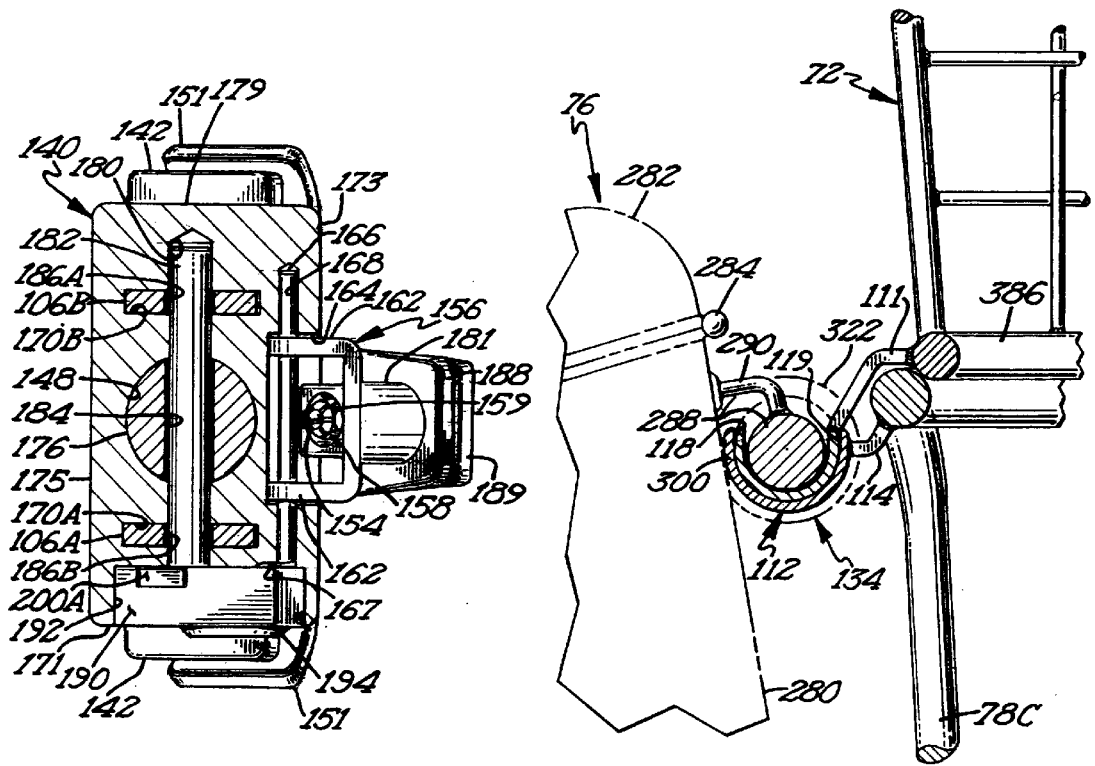
Fig 4
Fig 19

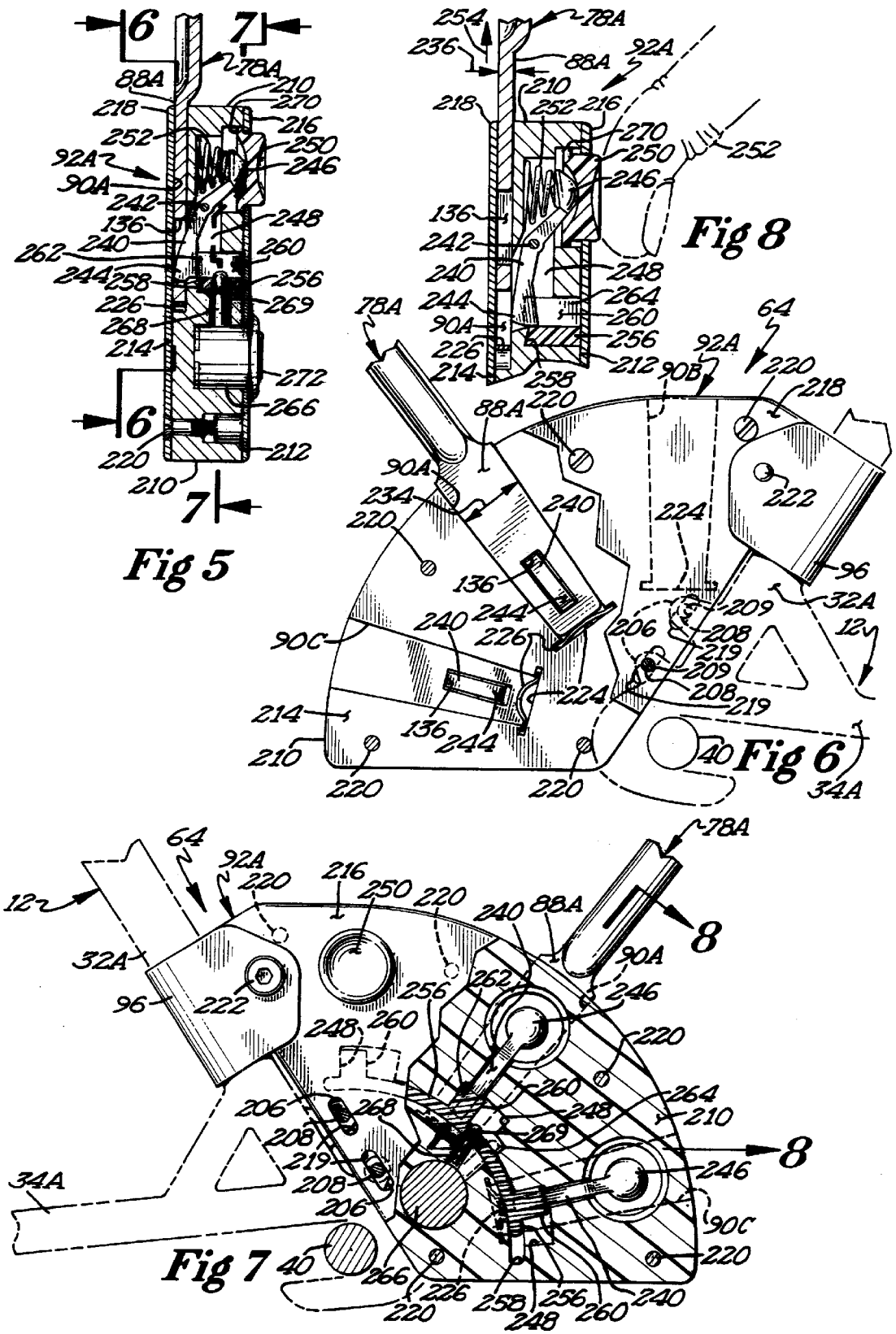

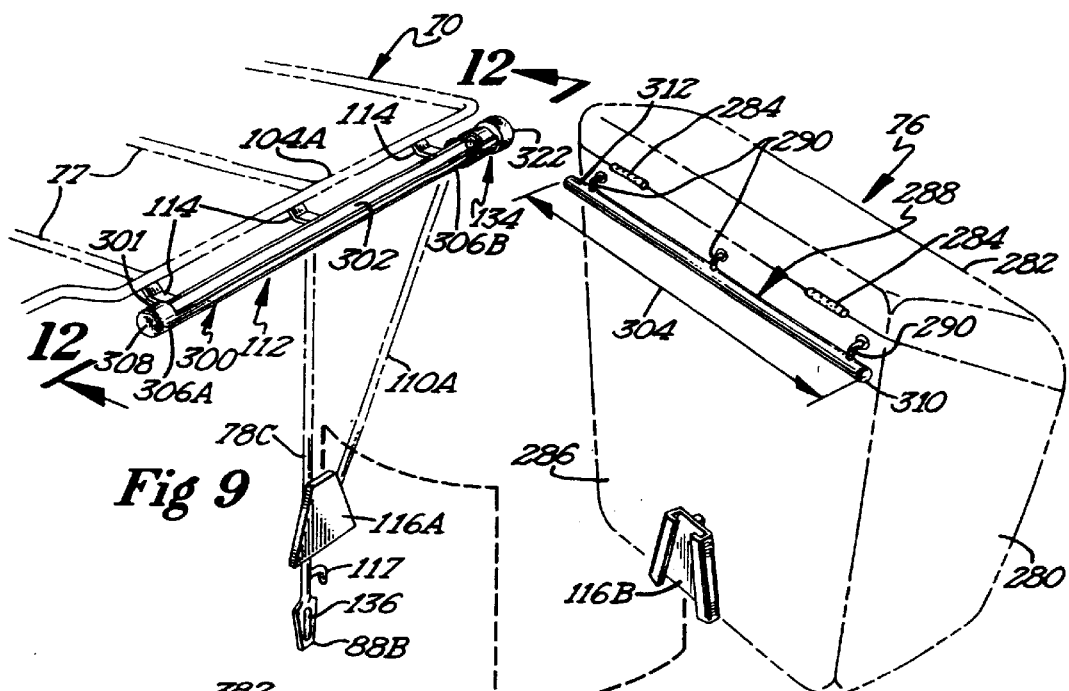
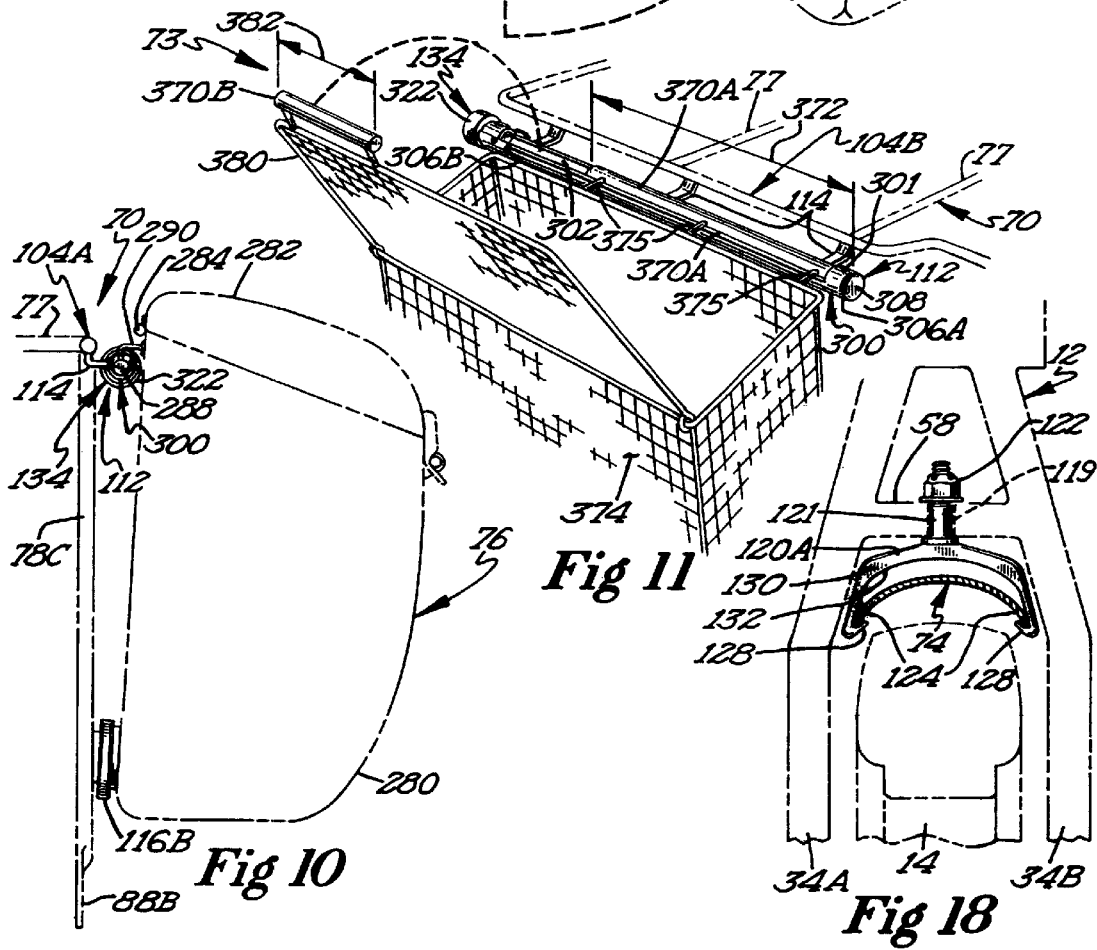

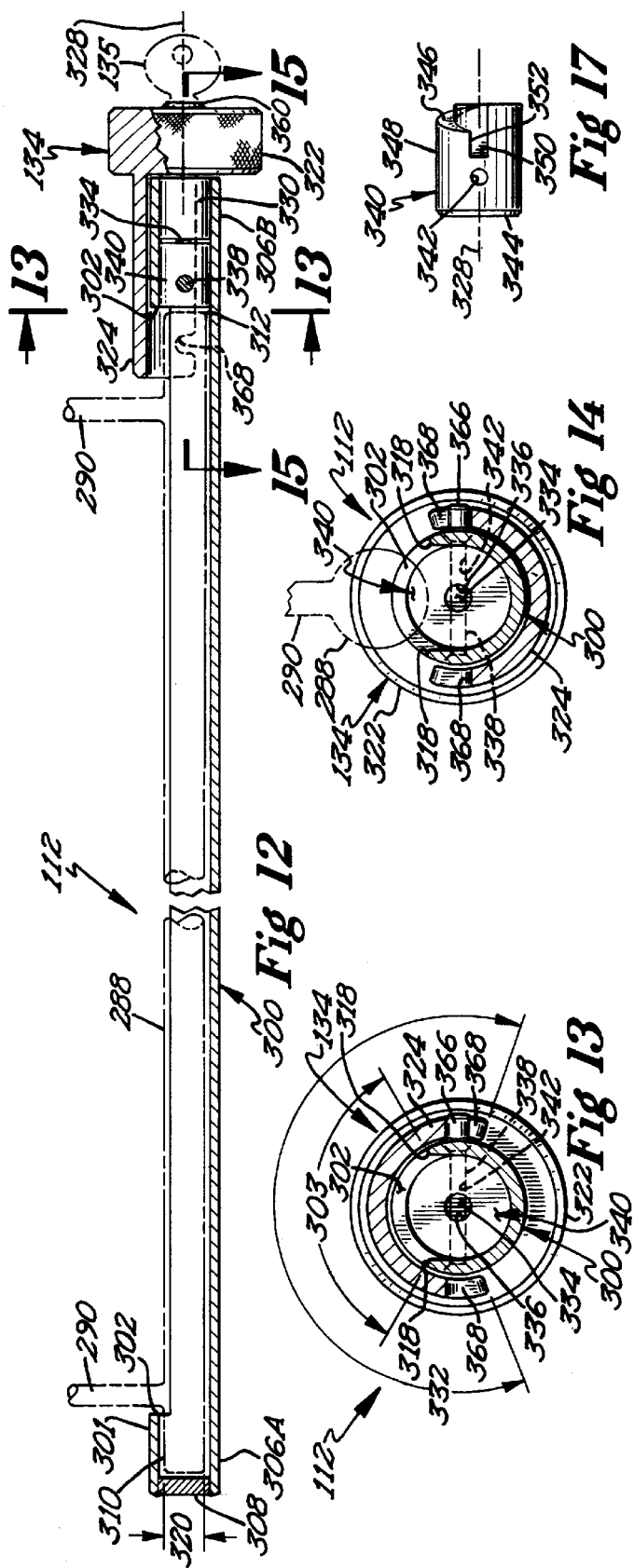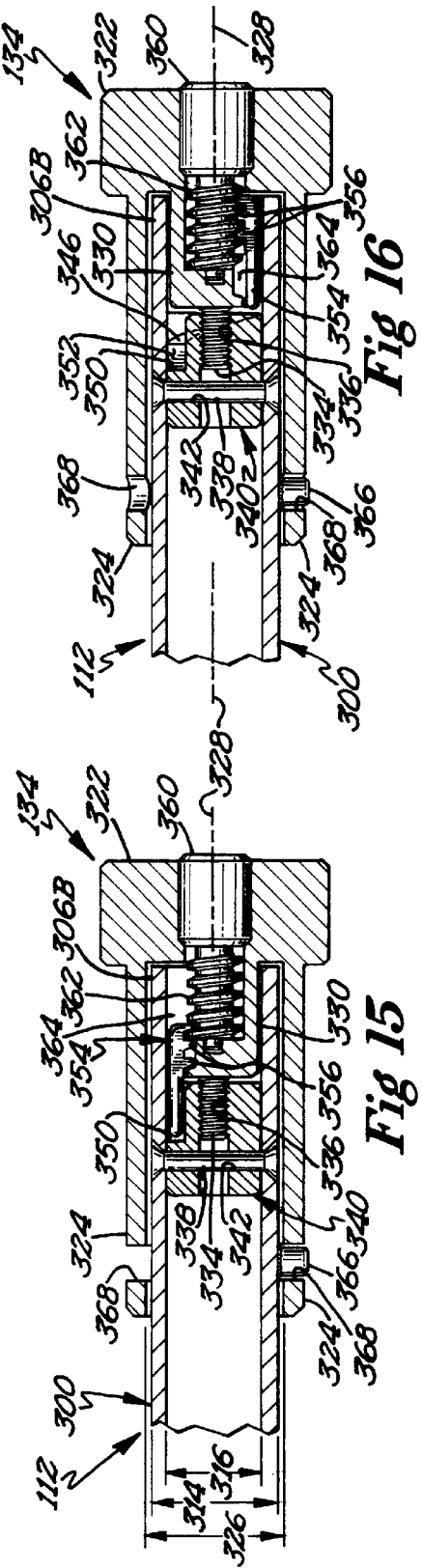

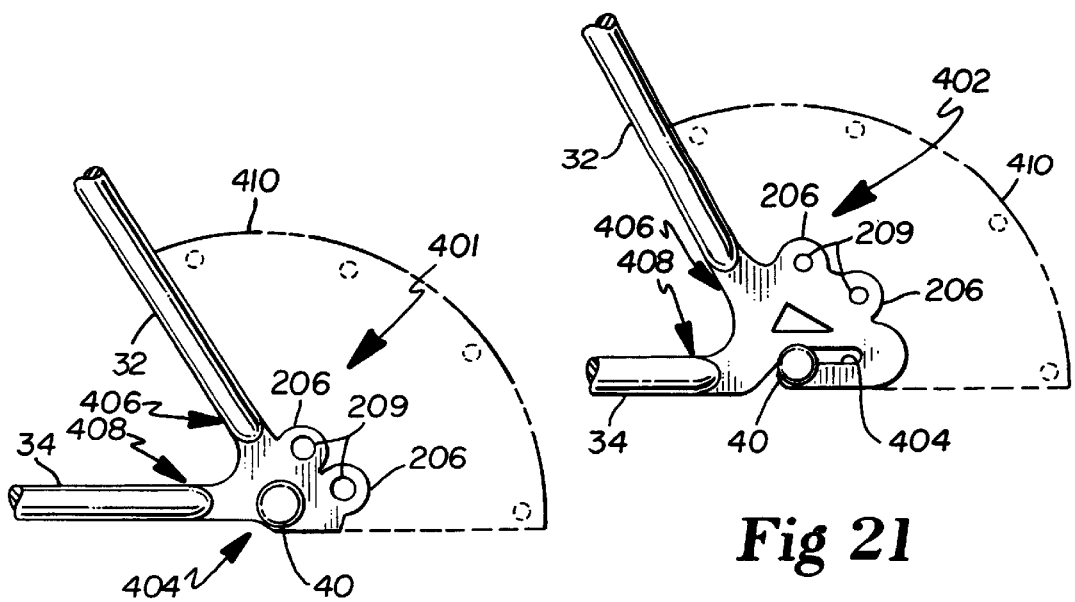
Fig 20
Fig 21
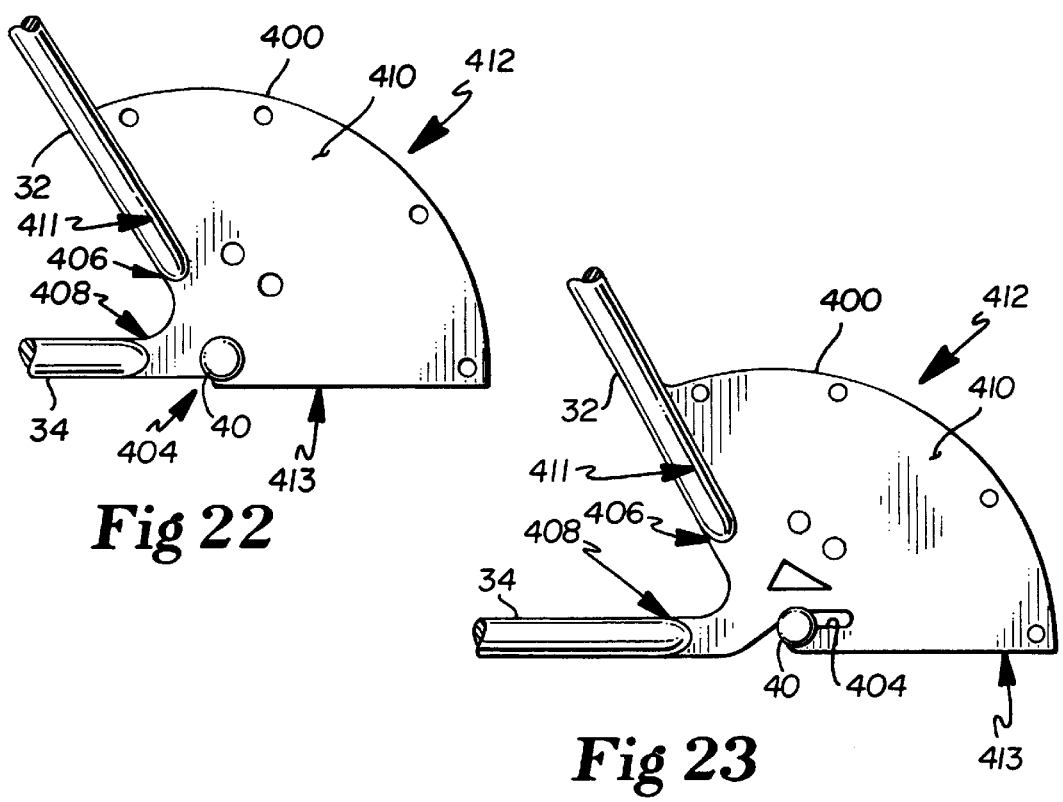
Fig 22
Fig 23

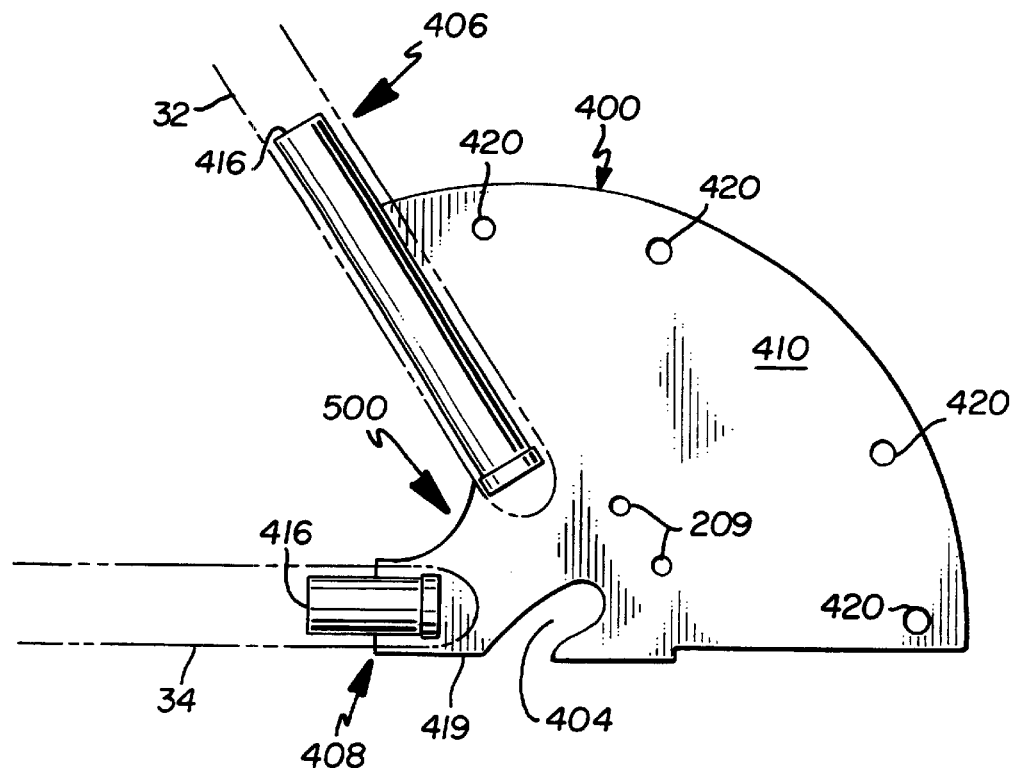
*Fig 24*
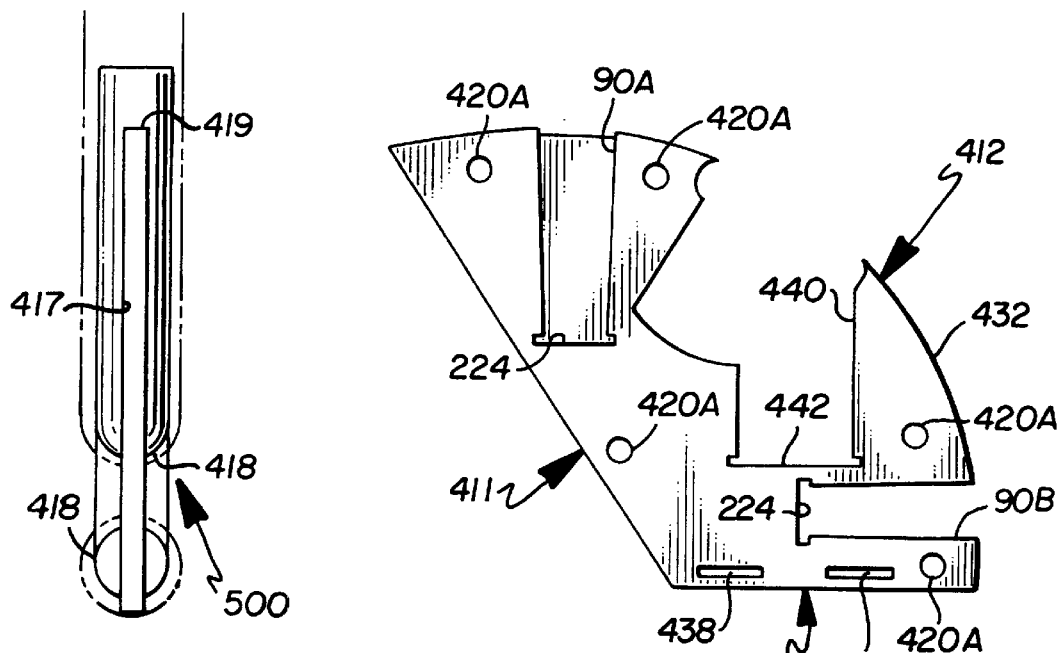
*Fig 25*   *Fig 26*

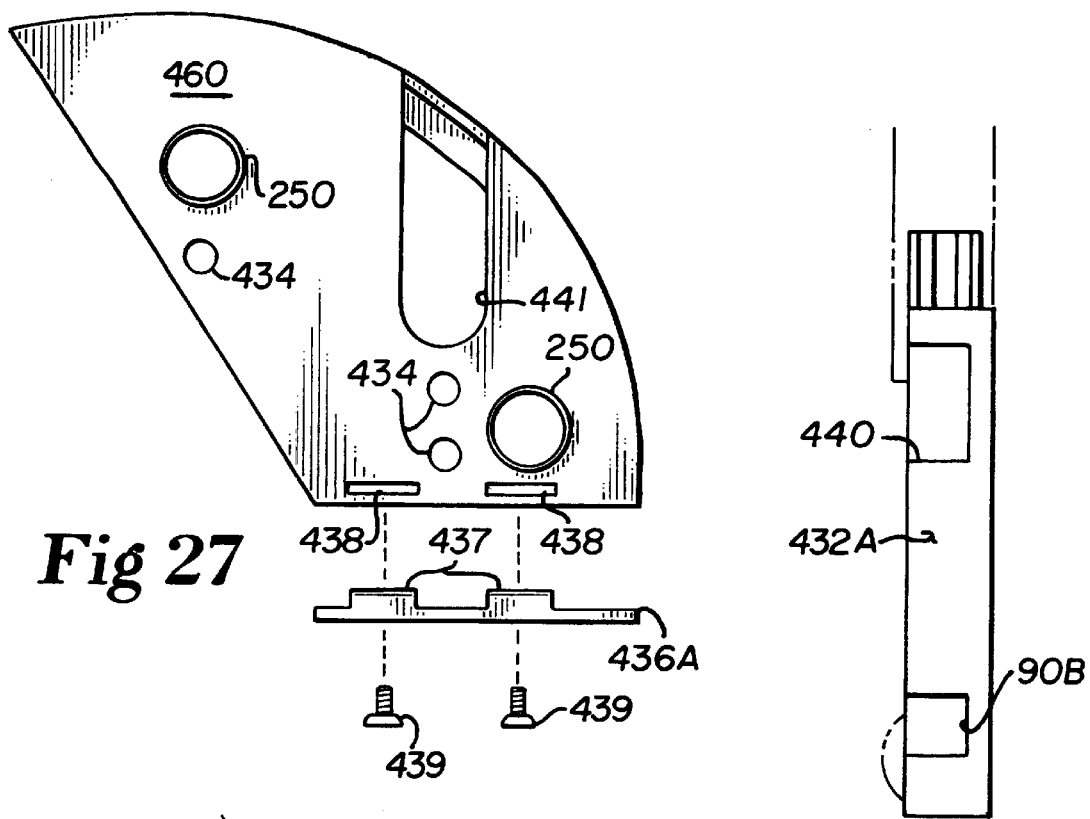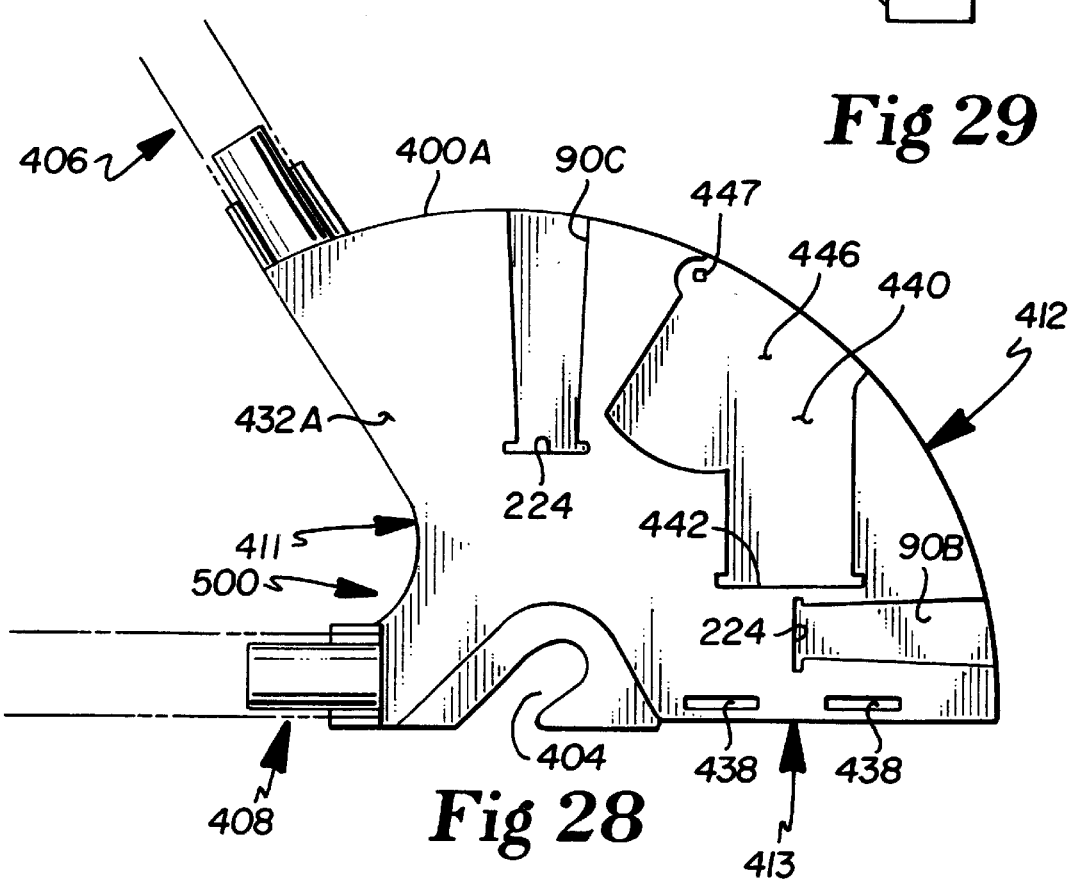

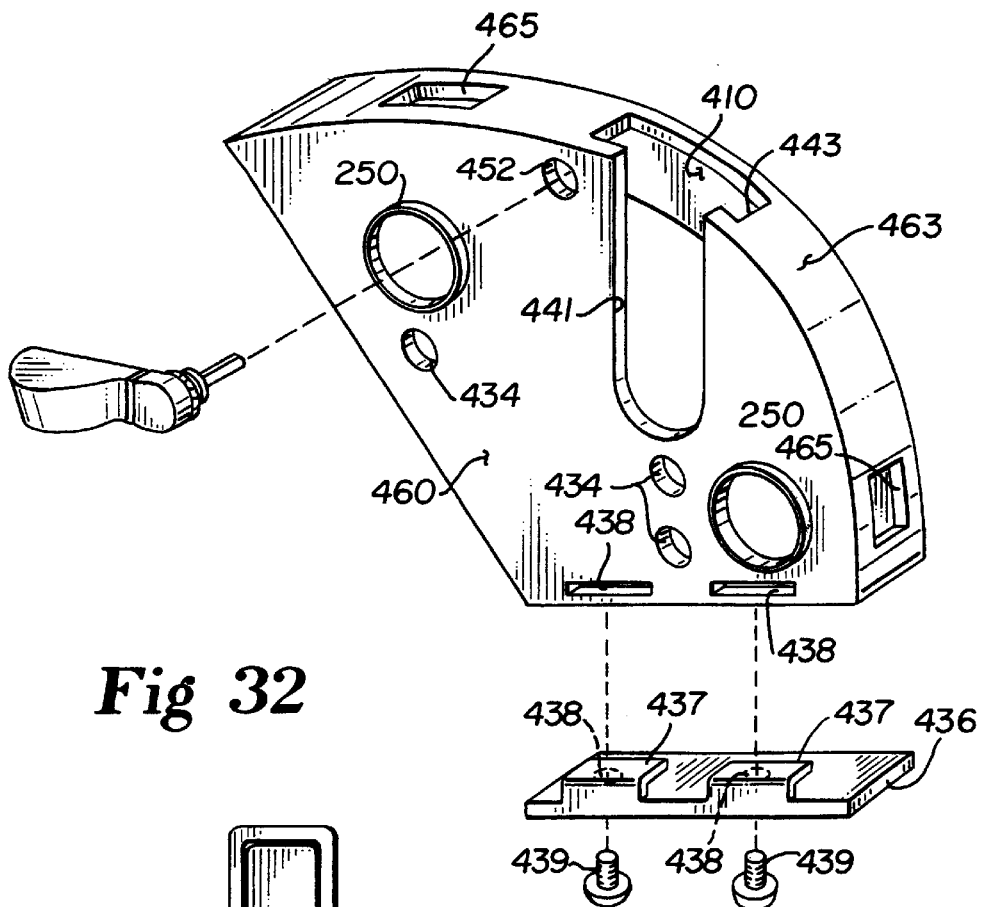
*Fig 32*
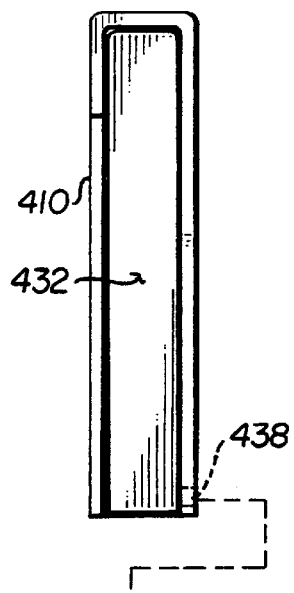
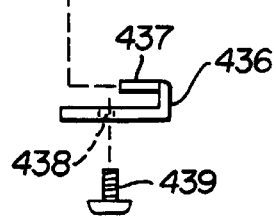
*Fig 33*

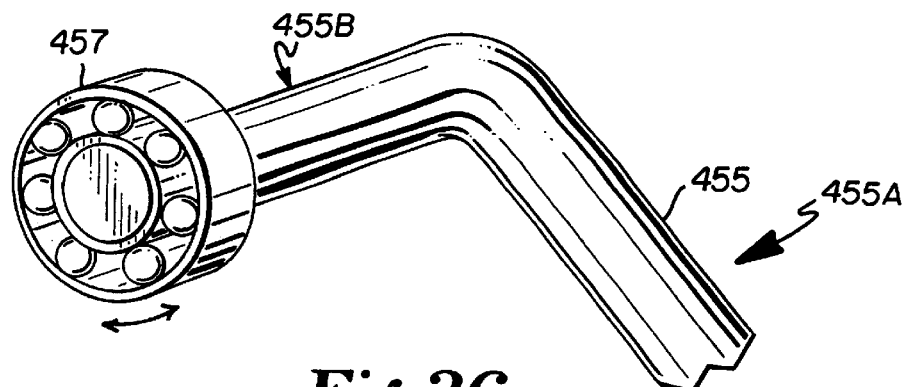
Fig 36
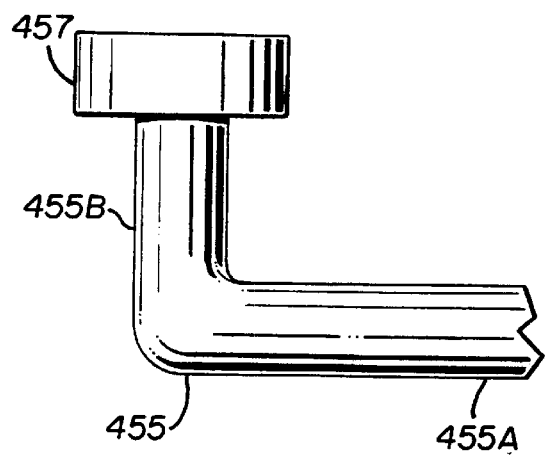
Fig 37
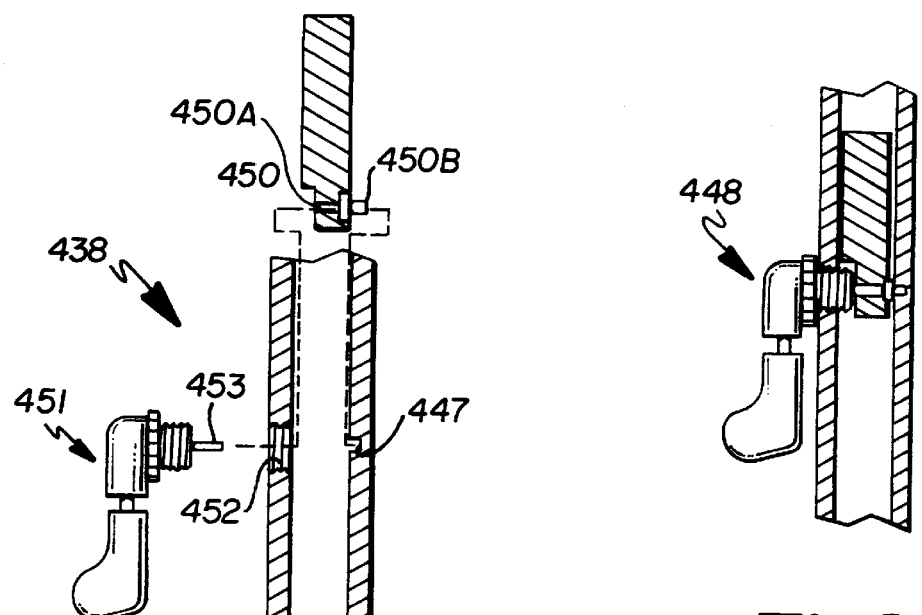
Fig 38
Fig 39

BICYCLE DROPOUT FRAME MEMBER

This application is a Continuation-In-Part of co-pending application Ser. No. 09/127,049, filed of Jul. 31, 1998 hereby incorporated by reference.

BACKGROUND OF THE INVENTION

The present invention relates generally to apparatus for mounting one or more accessories to a bicycle. More particularly, this invention pertains to an improved bicycle dropout frame member for interchangeably mounting a variety of accessories, either alone or in simultaneous combination, to a bicycle frame.

In the prior art, U.S. Pat. No. 4,883,283 of Hazelett et al. discloses a bicycle hitch for a one-wheel trailer with a horizontal tubular hitch bar.

U.S. Pat. No. 5,240,266 of Kelley et al. discloses an improvement in the Hazelett et al. hitch.

U.S. Pat. No. 4,928,985 of Nowlin shows a bicycle buggy apparatus having a tongue-and-socket pin hitch attachable to a sleeve placed on the seat support frame member.

U.S. Pat. No. 5,039,120 of Stowe teaches a bicycle towing apparatus including a horizontal member vertically pivotable about a seat support member and a pair of legs extending from the rear end of the horizontal member to the rear wheel axle.

U.S. Pat. No. 4,328,915 of Melton, III discloses apparatus for mounting a basket or other accessory to a carrier rack of a conventional bicycle.

U.S. Pat. No. 2,583,550 of Dennis et al. shows a support for attaching a wire basket to the front of a bicycle.

U.S. Pat. No. 4,577,786 of Dowrick et al. discloses a device for securing a pannier bag to a bicycle frame.

U.S. Pat. No. 4,418,850 of Jackson et al. discloses a pannier which is attachable to the rear carrier rack of a bicycle.

U.S. Pat. No. 4,440,331 of Schimmels teaches a construction of a child protective carrier mountable over a bicycle wheel.

U.S. Pat. No. 5,395,130 of Rubin discloses a bicycle balance trainer. The bicycle balance trainer is essentially a handle which attaches to a bicycle at positions and with bolts usually employed for mounting training wheels but does not suggest a dropout frame member capable of simultaneously mounting several bicycle accessories to a bicycle frame. The handle of the Rubin invention is used by a person to give aid to a novice bicycle rider learning to ride a bicycle.

There are many accessories which are currently useful to bicyclists. These include removable fenders over the front and/or rear wheels, bicycle cargo carrying racks which may be positioned over either wheel, cargo carrying racks with integral baskets, saddlebags or panniers which are generally mounted on a cargo carrying rack, and even small trailers for carrying children or other cargo.

While all of the above-indicated accessories are known and available on the market, each accessory typically has its own mounting system by which it is attached to the bicycle. At times, the mounting system of one available accessory makes simultaneous mounting of other accessories difficult, inconvenient or impossible. Generally, the various accessory mounts are incompatible.

The bicycle mounting devices in the prior art also have additional drawbacks, namely that most such devices are attached in a semi-permanent way and require tools and installation time to mount or remove the device, and that those few devices which quickly engage or release the accessory are rarely lockable or capable or capable of protecting the accessory and its contents from being stolen. None of the references enables the simultaneous mounting of a wide variety of standard accessories to a bicycle, whereby individual accessories may be quickly and easily mounted or removed as desired.

In addition to the lack of points of attachment for bicycle accessories, another recognized problem in the mounting of bicycle accessories to the frame of a bicycle is that generally, the points of attachment are only as sturdy as the mechanical fastener used to secure mounting apparatus to the frame of the bicycle. And as was stated above, it may be difficult to secure an attachment apparatus to the frame of a bicycle. To remedy this problem, the present invention provides an attachment apparatus for simultaneous mounting of multiple bicycle accessories that is integral to the frame of the bicycle. The attachment apparatus takes the form of an improved dropout frame member which in part comprises a web extending rearward from the frame of the bicycle, the web having formed therein a slot for securing an axle of a bicycle wheel to the frame and also apertures for attaching bicycle accessories to the frame of the bicycle. The web may be arcuate, rectangular, or any other suitable geometric configuration.

BRIEF SUMMARY OF THE INVENTION

The present invention may be characterized as an improvement upon a standard, prior art bicycle dropout. Bicycle dropouts typically comprise a plate having a slot that is arranged to receive a wheel axle, a plurality of bores formed adjacent the slot, and a pair of frame attachment structures connected to the plate. The frame. attachment structures are used to attach the slotted plate to a lower beam and a strut of a bicycle frame. In addition, the frame attachment structures each have an axis and the respective axes meet at an intersection. The improvement of the present invention comprises an elongate web formed integral with the plate which extends upwardly and rearwardly from the intersection of the axes of the frame attachment structures and beyond the plurality of bores. The web has an outer side and an inner side that are bounded by a lower edge, a leading edge, and a trailing edge. The web also comprises a plurality of accessory attachment apertures formed through the web in a predetermined arrangement adjacent the trailing edge of the web. Typically, the web will span more than 90° between its bottom and leading edges but it may also span less than 90°. The web will not typically extend below the lower beam of the bicycle frame.

The improved bicycle dropout may have coupled thereto a central body having a plurality of receiving slots for receiving a plurality of attachment members of a plurality of primary accessory legs. The receiving slots of the central body have a plurality of spring biased levers disposed therein such that a lever intersects each of the receiving slots to engage and retain the ends of the primary accessory legs of each of the attachment members that may be inserted into the receiving slots. The receiving slots in the central body are also generally provided with a cover that is secured to the web so as to sandwich the central body between the cover and the web of the improved dropout frame member.

In addition to the receiving slots, the central body may also be provided with a hitch slot sized so as to receive an insertable end of a removable towing hitch apparatus. Where the central body is provided with a hitch slot, the cover has formed therein a narrower hitch retaining slot that is positioned over the hitch slot in the central body so as to retain the insertable end of the towing hitch apparatus within the hitch slot. A latching mechanism which may be included within the hitch slot to selectively retain the insertable end of the towing hitch apparatus within the complementary slots of the central body and the cover. Furthermore, a locking mechanism for locking the insertable end of the towing hitch apparatus within the complementary slots of the central body and cover may also be provided.

As an alternative to bolting or otherwise connecting the central body to the web of the improved bicycle dropout of the present invention, the central body may be formed integral to the web. The integral central body will include all of the structural features described above, including, but not limited to, a plurality of receiving slots for receiving the attachment members of a plurality of primary accessory legs, a hitch slot sized to receive an insertable end of a removable towing hitch apparatus, a cover arranged to be secured over the integral central body, the cover having formed therein a hitch retaining slot positioned over the hitch slot in the central body to retain the insertable end of the towing hitch apparatus within the hitch slot in the central body, a latching mechanism which may selectively retain the insertable end of the towing hitch apparatus within the hitch slot of the central body, and a locking mechanism for locking the insertable end of the towing hitch apparatus within the hitch slot of the central body.

A bicycle dropout frame member constructed and arranged according to the present invention may comprise a plate having a slot for receiving a bicycle wheel axle and first and second frame attachment structures extending from the leading edge of the plate for securing the plate to the frame of a bicycle. At least one accessory mounting post may extend from the trailing edge of the plate of the bicycle dropout frame member to permit bicycle accessories to be attached to the bicycle. The mounting post is preferably arranged to receive and retain thereover an accessory leg, e.g. the mounting post is generally cylindrical from its tip to its base and has a shoulder formed around the base thereof so as to limit the insertion of the mounting post into a mating cavity formed in the end of the accessory leg. Typically, the mounting post will also comprise a retaining mechanism for securely and releasably retaining the accessory leg on the mounting post.

The bicycle dropout frame member may also comprise a towing hitch structure for towing a trailer behind the bicycle. In this case, the plate or web of the dropout frame member will be constructed to span the region between the first and second frame attachment structures. A suitable towing hitch structure will comprise a stopped bore formed in the plate between the first and second attachment structures. A locking channel is formed through the plate from the leading edge of the plate to the stopped bore. A hitch pin secured to the trailer to be towed behind the bicycle is sized to be received within the stopped bore and may be retained in the stopped bore by a key that is insertable into the locking channel to engage a groove formed around the end of the hitch pin. The key may also be lockable so as to prevent unwanted persons from detaching the trailer from the bicycle.

The improved bicycle dropout frame member summarized above may be used to support or as a part of a universal accessory mounting system such as the one described both herein and claimed in the parent of this present application.

These and other objects and advantages of the invention will be readily understood by reading the following description in conjunction with the accompanying figures of the drawings wherein like reference numerals have been applied to designate like elements throughout the several views.

BRIEF DESCRIPTION OF THE DRAWINGS

FIG. 3 is a cross-sectional top view of the upper attachment assembly of the multipurpose mounting apparatus of the invention, taken in the direction of cutting plane 3—3 of FIG. 1;

FIG. 4 is a cross-sectional rear view of the upper attachment assembly of the multipurpose mounting apparatus of the invention, taken in the direction of cutting plane 4—4 of FIG. 3;

FIG. 5 is a cross-sectional view of a lower attachment assembly of the multipurpose mounting apparatus taken in the direction of cutting plane 5—5 of FIG. 1;

FIG. 6 is a right side view, taken partially in section, of a lower attachment assembly of the multipurpose mounting apparatus of the invention, taken in the direction of cutting plane 6—6 of FIG. 5;

FIG. 7 is a partial cross-sectional left side view of a lower attachment assembly of the multipurpose mounting apparatus of the invention, taken in the direction of cutting plane 7—7 of FIG. 5;

FIG. 8 is a partial cross-sectional enlarged front view of a lower attachment assembly of the multipurpose mounting apparatus of the invention, illustrating the removal of an accessory leg therefrom, taken in the direction of cutting plane 8—8 of FIG. 7;

FIG. 9 is a front perspective, partially exploded view of a closed pannier mountable on a luggage rack embodying the invention;

FIG. 10 is a front cross-sectional view of the mounting arrangement for one style of closed pannier mounted on a luggage rack attached to a multipurpose mounting system of the invention, taken in the direction of cutting plane 10—10 of FIG. 1;

FIG. 11 is a perspective view of a basket mounted on a luggage rack attached to the multipurpose mounting system of the invention;

FIG. 12 is a cross-sectional view of a pannier/basket locking mount on a luggage rack attached to a multipurpose mounting system of the invention, taken in the direction of cutting plane 12—12 of FIG. 9;

FIG. 13 is a cross-sectional view of a locking mount of the invention in a locked position, taken in the direction of cutting plane 13—13 of FIG. 12;

FIG. 14 is a cross-sectional view of a locking mount of the invention in an unlocked position, taken in the direction of cutting plane 13—13 of FIG. 12;

FIG. 15 is a cross-sectional view of part of a locking mount of the invention in a locked position, taken in the direction of cutting plane 15—15 of FIG. 12;

FIG. 16 is a cross-sectional view of part of a locking mount of the invention in an unlocked position, taken in the direction of cutting plane 15—15 of FIG. 12;

FIG. 17 is a side view of a locking cam plug of the pannier/basket locking mount of the invention;

FIG. 18 is a cross-sectional top view of a fender guideway and retained fender attached to a bicycle in accordance with the invention, taken in the direction of cutting plane 18—18 of FIG. 1;

FIG. 19 is a partial end view of a top basket and pannier of the invention simultaneously mounted on a luggage rack embodying the invention;

FIG. 20 is a side view of a prior art vertical dropout having the web of the present invention superimposed thereover in phantom lines;

FIG. 21 is a side view of a prior art horizontal dropout having the web of the present invention superimposed thereover in phantom lines;

FIG. 22 is an improved bicycle dropout frame member of the present invention comprising a vertical slot for a bicycle wheel axle;

FIG. 23 is an improved bicycle dropout frame member of the present invention comprising a horizontal slot for a bicycle wheel axle;

FIG. 24 is a side view of an embodiment of the improved bicycle dropout frame member having a vertical slot for a wheel axle;

FIG. 25 is an end view of the improved dropout frame member of FIG. 24;

FIG. 26 is a side view of a central body arranged to be coupled to the improved drop out frame member;

FIG. 27 is a broken out side view of the web of the improved dropout frame member having the central body and a cover coupled thereto;

FIG. 28 is a side view of an embodiment of the improved dropout frame member of the present invention having a central body formed integral to the web thereof;

FIG. 29 is an end view of the embodiment illustrated in FIG. 28;

FIG. 32 is a partially exploded view of the central body and cover showing how a bottom plate is secured to the cover;

FIG. 33 is a partially exploded end view of the central body as illustrated in FIG. 32, further depicting how the bottom plate is secured to the cover;

FIG. 36 is a perspective view of the towing hitch apparatus;

FIG. 37 is a top view of the towing hitch apparatus;

FIG. 38 is a partially exploded cut-away view of the latch illustrating how the latch mechanism is disposed between the central body and the cover;

FIG. 39 is a cut-away view of the latch illustrating how the latch mechanism is disposed between the cover and the central body;

DETAILED DESCRIPTION OF THE INVENTION

Figure 1:
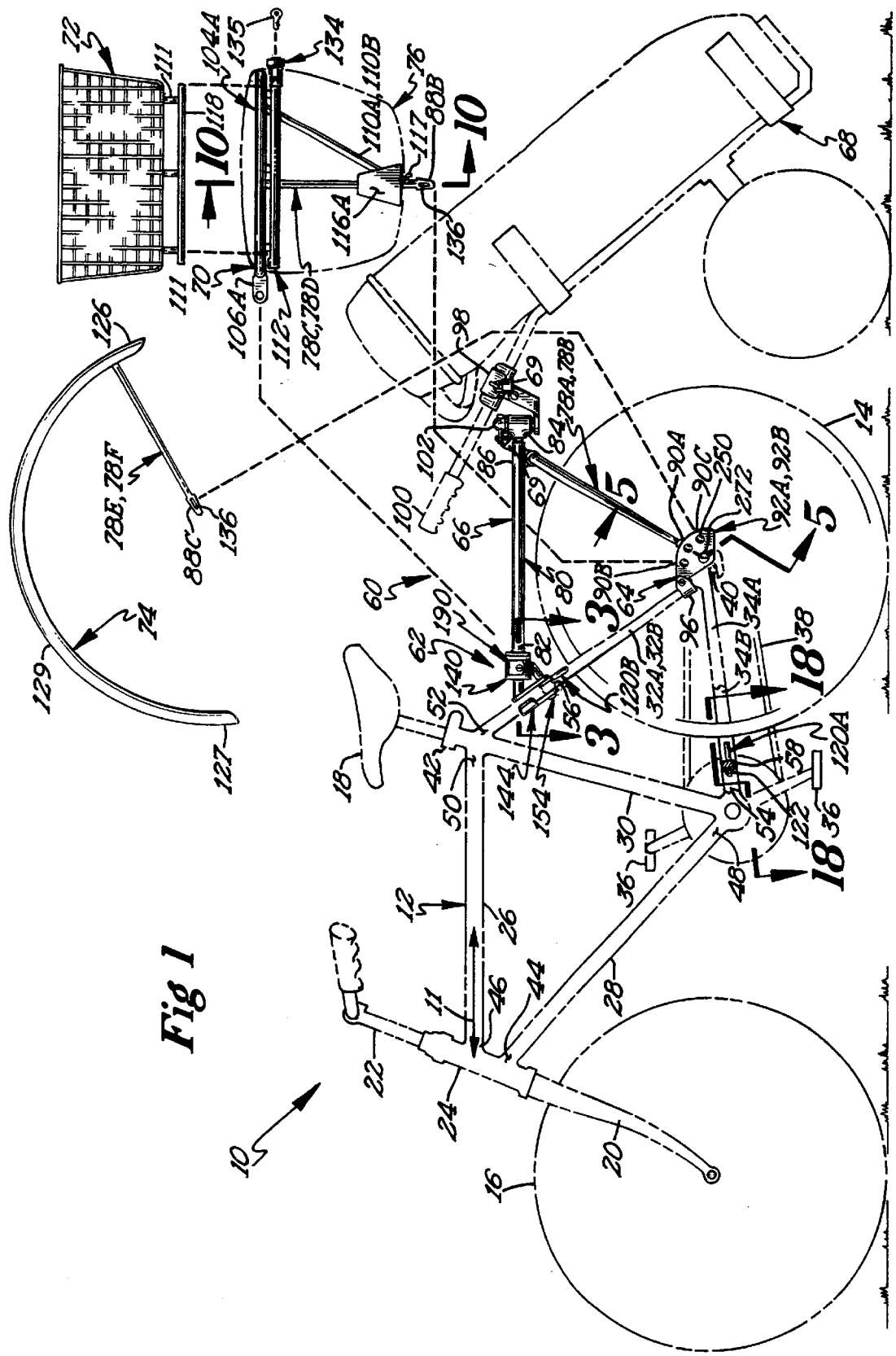
FIG. 1 is a left side view of a bicycle shown in phantom and upon which a multipurpose mounting apparatus embodying the invention is shown with multiple accessories which may be attached to the bicycle either singly or in combination.

With reference to the drawings, and particularly to FIG. 1, a conventional bicycle 10 is shown with a rigid tubular frame 12, rear wheel 14, front wheel 16, and seat 18. The frame 12 includes front fork 20 with attached steering post 22, front stem 24 through which steering post 22 passes, upper beam 26, front strut 28, center strut 30, a pair of rear struts 32A and 32B, and a pair of lower beams 34A and 34B. The rear wheel 14 is driven by foot pedals 36 typically acting through a chain 38 to a drive (not shown) with one or multiple gear ratios. One each of the rear struts 32A, 32B and lower beams 34A, 34B are positioned on each side of the rear wheel 14 and joined at or near the rear wheel axle 40. The spaced-apart lower beams 34A, 34B are typically interconnected by a cross-bar 58. A seat mount 42 is typically a telescoping extension of the center strut 30. The frame 12 is typically formed by welding the front ends 44 and 46 of the front strut 28 and upper beam 26, respectively, to the front stem 24, and the rear ends 48 and 50 of the front strut 28 and upper beam 26, respectively, to the center strut 30. The front ends 52 of the rear struts 32A, 32B and the front ends 54 of the lower beams 34A, 34B are joined to the center strut 30. The left and right rear struts 32A and 32B are typically interconnected by one or more cross-braces 56 which may be straight or arcuate (see FIG. 2).

The longitudinal axis 11 of the bicycle 10 is shown in FIG. 1 for reference purposes.

A universal multipurpose accessory mounting system 60 is depicted in FIG. 1 as having an upper attachment assembly 62 and a lower attachment assembly 64, both of which may be locked to the bicycle frame 12. The mounting system 60 is shown attached to the rear struts 32A, 32B but alternatively, may be attached to other frame members, e.g. to the steering post 22 and/or front fork 20 for mounting accessories over the front wheel 16.

Accessories which are mounted to both the upper attachment assembly 62 and the lower attachment assembly 64 by bilateral legs are denoted herein as "primary accessories" and include a hitch assembly 66 and a luggage carrier 70. Accessories which are not directly mounted to both of the upper and lower attachment assemblies 62, 64 are denoted herein as "secondary accessories". Such accessories include wheeled trailers such as a golf cart 68 as well as a top basket 72, side baskets 73, panniers/saddlebags 76, wheel fenders 74, and lights/reflectors (not shown).

As illustrated in FIG. 1, a hitch assembly 66 useful for towing various types of trailers such as a golf cart 68, is shown mounted to the upper attachment assembly 62 and lower attachment assembly 64. Other accessories such as a luggage rack or carrier 70, top basket 72 and pannier 76 which may be attached to the luggage carrier 70, and a wheel fender 74 are shown in positions for simultaneous or selective additive attachment. Each of the hitch assembly 66, carrier 70, and fender 74 have elongate legs 78 with lower ends 88 which may be mounted bilaterally, i.e. one on each side of the wheel 14, in a receiving aperture such as apertures 90A, 90B and 90C in the stirrup members 92A, 92B (described hereafter) of the lower attachment assembly 64. In describing the legs 78 of these various accessories, the legs 78 associated with the hitch will be designated as 78A and 78B, the legs associated with the luggage carrier will be identified as 78C and 78D and the fender legs as 78E and 78F, all as more specifically set out hereafter. Similarly the lower ends 88 of the legs of the various accessories are designated 88A for the hitch, 88B for the luggage rack and 88C for the fender.

The hitch assembly 66 utilizes an elongate towing bar 80 having a first end 82 which is configured to be mountable in the upper attachment assembly 62. A hitch body 84 is mounted on the second end 86 of the towing bar 80 for attachment to a trailer such as the golf cart 68. The hitch body 84 is pivotably mounted to the towing bar 80 for pivoting movement about the center, horizontal axis of the tow bar 80.

Extending downwardly and forwardly from the towing bar 80 are two elongate legs 78A, 78B whose lower ends include apertured tips 88A which are configured to fit into receiving slots 90A in the stirrup members 92A and 92B of the lower attachment assembly 64. The left and right stirrup members 92A, 92B, respectively, are mounted to the left and right rear struts 32A, 32B by individual frame mounts 96, one stirrup member on each side of the wheel 14. Preferably, legs 78A, 78B are attached to the towing bar 80 near its second end 86. The legs 78A, 78B may be pivotably mounted on towing bar 80 for accommodating a range of bicycle sizes. It may be noted that towing bar 80 is preferably formed as a tubular structure to provide high strength at minimum weight and cost.

A connecting hitch member 98 is shown clamped to the golf cart arm 100 and has a pin 102 which allows the cart 68 to swivel about a vertical axis passing through the pin 102. The hitch member 98 may also be provided with a pivot mechanism to allow pivoting of the hitch member 98 relative to the hitch body 84 about a horizontal axis perpendicular to the plane of the drawing of FIG. 1. Such a horizontal pivot axis is pictured in FIG. 1 just below and to the left of the lock 69 on hitch member 98. While the hitch body 84 and hitch member 98 have been described as using specific features allowing pivoting about three axes, it should be understood that various other universal joint configurations may be substituted so long as the connection between trailer and bicycle allows flexibility between bicycle and trailer. The hitch configuration is illustrative of the myriad of possible hitch designs and may be provided with locking means such as a small padlock 69 or other suitable lock to inhibit theft of the trailer. Of course, the hitch may be of any type which provides the desired attachment to a bicyclist's particular trailer, whether it is a golf cart, wagon, child carrier, or other type of trailer. The clamp hitch member 98 is particularly adaptable for towing a variety of trailer configurations.

As shown in FIGS. 1 and 9–11, a luggage carrier 70 is a primary accessory with the capability of supporting other secondary accessories such as top-mounted basket 72 as well as side mounted basket(s) 73 or pannier(s) 76. The carrier 70 includes a plurality of elongate members 104A and 104B joined by transverse members 77 to form a platform and having a pair of tongues 106A and 106B which may be inserted and retained in the upper attachment assembly 62 (see FIG. 2). Downwardly extending legs 78C, 78D have lower ends with apertured tips 88B which are inserted and retained in receiving slots 90B in the left and right stirrup members 92A, 92B. The carrier 70 is shown as having a pair of braces 110A and 110B, one brace extending from each side of the carrier to the corresponding leg 78C, 78D, thus enabling higher weight loads to be supported on the carrier.

Also shown in FIG. 1 is a means for attaching a pannier or saddle bag 76 on one or both sides of the carrier 70. The carrier 70 has a pair of outboard elongate locking members 112, one attached on each side of the carrier by connectors 114. A wedge bracket 116A (FIG. 9) mounted on each leg 78C, 78D or on a brace 110A or 110B provides support for a matching clamp 116B on a lower portion of the pannier(s) 76. Each outboard locking member 112 (FIG. 9) is shown with a first closed end 306A and a second end 306B with a tube lock device 134 operated with a key 135. The tube lock device 134 may be used for lockably attaching other secondary accessories such as side baskets 73, and is shown further in FIGS. 9 through 17, and 19 and discussed infra, in relationship thereto.

A top basket 72 (FIG. 1) or other container may be formed of any material such as metal screen, wood, plastic, or basket material, and may be mounted atop the carrier 70. Attached to each side of the basket 72 by downwardly extending connectors 111 is a mounting trough 118 which is lockably supportable in the corresponding outboard locking member 112 of the carrier 70. The particular construction of the mounting trough 118 will be further discussed hereafter in association with FIG. 19.

In FIGS. 1 and 18, a removable rear wheel fender 74 is shown as being attachable to the bicycle frame 12. The fender 74 has a pair of legs 78E, 78F near the fender rear end 126. The legs 78E, 78F pass to the left and right sides of the rear wheel 14. Each leg 78E, 78F has a perforated lower end 88C, which is insertable in one of two receiving slots 90C in the stirrups 92A, 92B.

Figure 2:
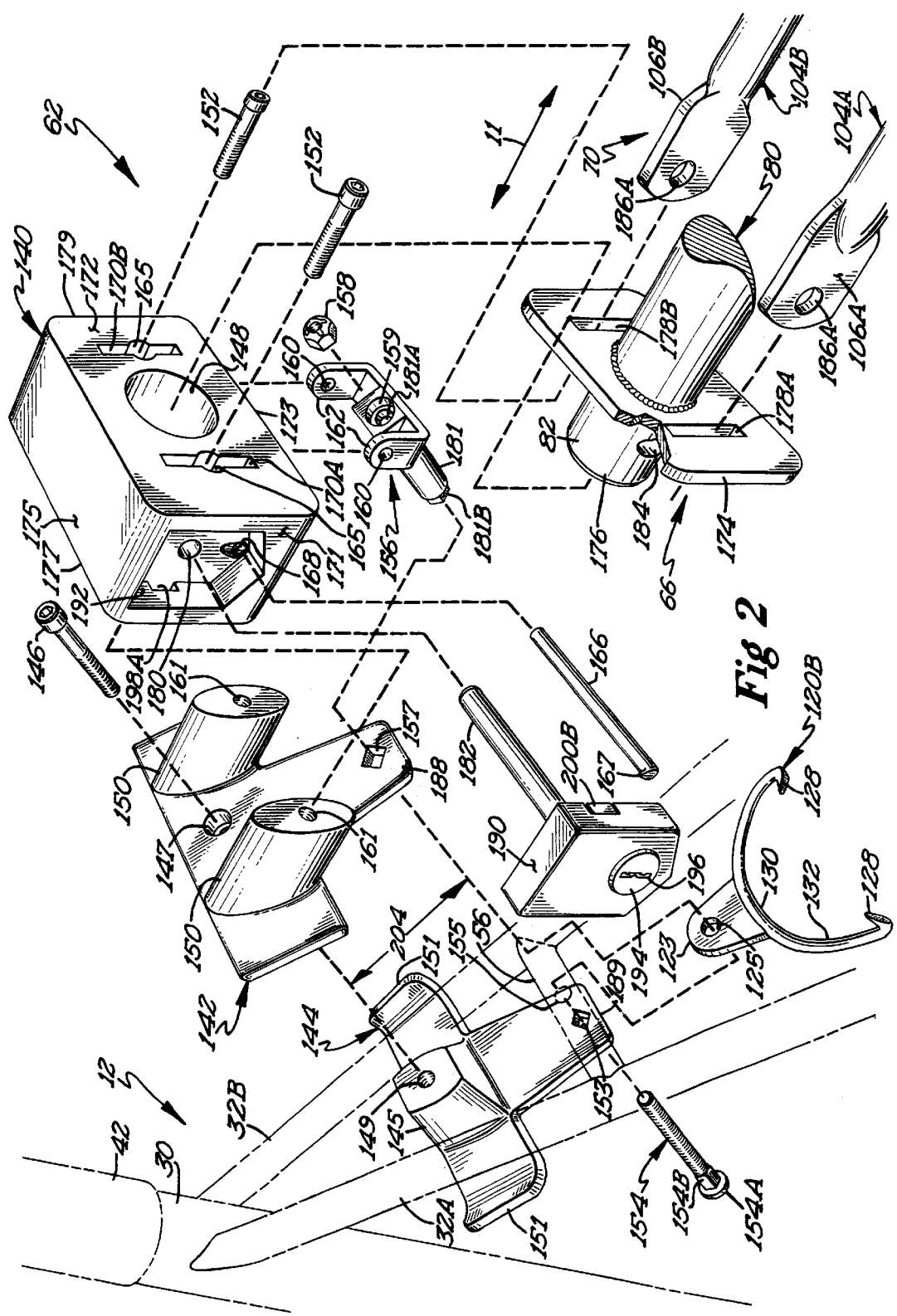
FIG. 2 is a perspective, enlarged and exploded, left side view of an upper attachment assembly of the multipurpose mounting apparatus of FIG. 1.

As shown in FIG. 18, a first fender support C-clip 120A has a threaded post 121 which passes through a hole 119 in crossbar 58. A fastener such as nut 122 is threadably engaged with post 121 to rigidly hold the C-clip 120A. A second fender support C-clip 120B is shown in FIG. 2 as having a tab 123 with a hole 125 through which a screw 154 is passed to attach the C-clip to the cross-brace 56 which connects rear struts 32A, 32B. Thus, two fender support C-clips 120A, 120B retain the frontal portion 127 and central portion 129 of the fender 74, while the rear end 126 is supported by legs 78E, 78F, providing secure retention of the fender 74. As illustrated in FIGS. 2 and 18, C-clips 120A, 120B are guideways configured to pass around the curved configuration of fender 74 and tightly retain the fender edges 124 engaged within opposing hook ends 128 of the clip. A pliable material 130 such as a rubber or plastic surface coating having a relatively high coefficient of friction may be applied to the interior 132 (FIG. 18) of the C-clip 120A and 120B to frictionally engage and retain the fender 74 within the C-clip. The material 130 also inhibits rattling or vibration of the fender 74 while riding over rough terrain.

The fender 74 is simply mounted by threading it through the C-clip(s) 120A and 120B from the rear of the bicycle and then inserting and locking the perforated leg ends 88C into receiving slots 90C.

By mounting a primary accessory, i.e. a hitch assembly 66 and/or carrier 70 in the upper and lower attachment assemblies 62, 64 the accessory is securely and rigidly retained at three points, i.e. at the upper attachment assembly 62 and on each of the left and right sides of the rear wheel 14. Alternatively, the mounting apparatus 60 may be mounted about the front wheel 16, i.e. to the front fork 20 and/or steering post 22 and swing with the wheel as it is steered to the left or right. Of course, a hitch assembly 66 in the front of the bicycle 10 may at times be useful for towing of the bicycle from another vehicle.

Thus, panniers or side baskets, a wheel fender, a top basket, lights, reflectors and other secondary accessories including a trailer hitch may be mounted simultaneously or in various additive combinations, using the universal accessory mounting system 60, to suit the needs of the particular bicyclist.

A more complete description of the apparatus follows in a discussion of the remaining figures. Turning now to FIGS. 2, 3, and 4, an upper attachment assembly 62 is shown as including a generally solid mounting block 140 rigidly attachable to the rear struts 32A, 32B of a bicycle frame 12 using upper and lower clamp members 142, 144. The mounting block 140 is shown as being generally a rectangular hexahedron including an accessory insertion face 172 and a lock insertion face 171 which is generally disposed at a right angle with face 172. An upper face 175, lower face 173, reverse face 177 and reverse side face 179 of the mounting block 140 are also shown in the drawings. The mounting block 140 may be of any shape which permits attachment to a bicycle frame 12 and insertable attachment of accessory tongues thereto as further described herein.

The rear struts 32A, 32B of the bicycle frame 12 are clamped between the clamp members 142, 144, the clamp members being joined with a screw 146 passing through a hole 147 in the upper clamp member 142 and threaded into a tapped hole 149 in lower clamp member 144. The lower clamp member 144 is shown with outwardly and upwardly flared wings 151 to ensure a rigid attachment of the mounting block 140.

As depicted, the upper clamp member 142 has screw retaining structure shown as left and right posts 150, each of which has a central threaded hole 161. The upper clamp member 142 is attached to the mounting block 140 with screws 152, which pass entirely through apertures 165 (FIG. 2), slip through holes 163 in the reverse face 177 of the mounting block (see FIG. 3) and then thread into tapped holes 161. The holes 163 are aligned with slots 170A, 170B, shown as having enlarged portions 165 coaxial with holes 163 and extending inwardly from the accessory insertion face 172 for passage therethrough of the screws 152. Screws 152 are thus deeply recessed in mounting block 140 and have their heads bearing against shoulders 183.

The upper clamp member 142 and lower clamp member 144 have corresponding tongues 188, 189, respectively, which extend generally parallel to the rear struts 32A, 32B and therebetween. Thus, the clamp members 142, 144 may take a tricorn-like shape as shown. A hole 153 in the lower clamp tongue 189 and a corresponding hole 157 in the upper clamp tongue 188 permit attachment of the tongues to a cross-brace 56, and are disposed a distance 204 from holes 147, 149 to provide resistance to twisting of the mounting block 140. Distance 204 should be at least about 1.25 inches and preferably is at least about 1.5 to 2.5 inches.

As illustrated in FIGS. 2 and 4, the upper and lower clamp members 142, 144 are further connected to a lock yoke 156 which is lockable to the mounting block 140. A locking screw 154, which is preferably a carriage bolt, passes through hole 153 in the lower clamp member 144, through hole 155 in cross-brace 56, through hole 157 in the upper clamp member 142, through the passageway 181A in yoke column 181, and through enlarged hole 159 in lock yoke 156. The hole 153 is non-circular to match an underhead portion 154B of locking screw 154, thus preventing its rotation. The locking screw 154 has a circular head 154A and is secured to the lock yoke 156 by a threaded nut 158 which rests in enlarged hole 159. The locking screw 154 and threaded nut 158 are accessible only when the lock yoke 156 is not attached to the mounting block 140. The column 181 prevents access to the screw 154, and has a non-circular end 181B which matches and engages hole 157, preventing rotation of the yoke 156 relative to the upper clamp member 142. The lock yoke 156 has a hole 160 in each of its parallel ears 162. The ears 162 of yoke 156 are inserted into a recess 164 (see FIG. 4) in the mounting block 140 and locked therein by a pin 166 passing through a transverse aperture 168 in the mounting block 140 and through holes 160 of the yoke 156. The pin 166 is shown in FIGS. 2 and 4 with a head 167 to allow finger access for easy removal of the pin, thus releasing the lock yoke 156 from the mounting block 140. Unauthorized access to the pin 166 is prevented by insertion of a lockable lock plate 190 over the pin's head.

Thus, as illustrated, the mounting block 140 is attached to the bicycle frame 12 with a multiple-point mount which resists movement and unauthorized removal of the mounting block.

While the mounting block 140 has been described as being attached to the bicycle frame by means of a specific clamping device, it should be understood that other means of attachment may be substituted, and any attachment means which securely attaches the block 140 to the bicycle frame below and rearward of the seat may be substituted and is within the purview of the invention.

Attachment of the mounting block 140 to the bicycle 10 may be enhanced by including integral threaded bosses, not shown, incorporated in the bicycle frame 12 by the bicycle frame manufacturer.

When the mounting block 140 is mounted over the rear wheel 14, the accessory insertion face 172 faces rearwardly. The accessory insertion face 172 includes a generally horizontal central socket 148 which is generally parallel to the longitudinal axis 11 of the bicycle 10. The first end 82 of a towing bar 80 is mateably receivable and lockable in the central socket 148. In addition, two lateral slots 170A, 170B extend into the mounting block 140 parallel to socket 148. The first end 82 of the towing bar 80 includes a cylindrical tongue 176 and a face plate 174 securely affixed thereto. The face plate 174 has a pair of vertical slots 178A, 178B therein which are in alignment with, i.e. overlie the slots 170A, 170B of the mounting block 140 when the tongue 176 of towing bar 80 is mounted in block 140.

The tongues 106A, 106B (FIG. 1) of the elongate members 104 of luggage carrier 70 are retainably insertable in slots 178A, 178B, respectively in the face plate 174, and/or into the slots 170A, 170B, respectively, in the mounting block 140. A transverse pin aperture 180 extends horizontally through the mounting block 140, intersecting slots 170A, 170B, respectively, and central socket 148 so as to permit a horizontal pin 182 to be inserted in the aperture 180 and pass through hole 184 in the tow bar tongue 176 and through holes 186A, 186B in the carrier tongues 106A, 106B. The pin 182 serves as a locking mechanism for the towing bar 80 and/or the elongate members 104A and 104B of carrier 70. The locking pin 182 and pin 166 may be simply retained in place by friction, or by any other means which holds the pins within their respective transverse pin apertures 180, 168.

In one embodiment shown in the figures, a lock plate 190 is lockable within a cavity 192 in the lock insertion face 171 of mounting block 140 to prevent unauthorized access to the locking pins 182 and 166 without a key 135. Such a lock plate 190 is intended to prevent theft of the upper attachment assembly 62 and accessories attached thereto. As shown, a rotatable lock cylinder 194 with keyhole 196 is mounted in lock plate 190, which is configured for insertion into cavity 192 and locking therein. The cavity 192 includes opposed keeper spaces 198A, 198B for receiving and retaining lock bars 200A, 200B which are projected outwardly from the lock plate 190 by rotation of key 135. The locking pin 182 is shown as being attached to the lock plate 190 such that key activation and removal of the lock plate results in withdrawal of pin 182 and unlocking of towing bar tongue 176 and carrier tongues 106A and 106B whereby they may be withdrawn from the mounting block 140. When locking pin 182 is fully inserted in pin aperture 180, the pin obstructs apertures 165, thus preventing unauthorized access to and removal of screws 152, which join the mounting block 140 to the upper clamp member 142. The pin 166 may be removed by the operator inserting a finger nail under the head 167 and pulling the pin out, releasing the lock yoke 156. The mounting block 140 may be then removed from the bicycle frame 12 by removing screws 152. Thus, a single keylock controls the locking of (a) the mounting block 140 to the bicycle 10, (b) the towing bar 80 to the mounting block 140, and (c) the carrier 70 to the mounting block, making theft of the upper attachment assembly 62 and attached accessories difficult and time consuming.

If a key lock is not desired, a hand manipulable lever, button or other device may be used to release each of locking pins 166, 182. For example, a rotatable lever may be used in place of the lock cylinder 194 to move the lock bars 200A and 200B.

It is noted that in the illustrated configuration of the mounting block 140, insertion and locking of the carrier tongues 106A and 106B into the mounting block further discourages unauthorized access to screws 152 which connect the upper clamp member 142 to the mounting block.

In this invention, it is important that the towing bar 80 and carrier 70 may be individually or simultaneously mounted to the mounting block 140. A trailer may be attached to the towing bar 80. Secondary accessories are lockably attachable to the carrier 70.

The mounting block 140 may be formed by molding and/or machining of a strong plastic or metal, preferably a high strength dimensionally stable plastic or a lightweight metal such as aluminum or magnesium. It is also possible to form the mounting block 140 of plate metal pieces which are welded or otherwise joined to form interior channels for insertion of the yoke 156, carrier tongues 106A and 106B, towing bar tongue 176, locking pin 166, lock plate 190 with pin 182, and screws 152.

As shown in FIGS. 5, 6, 7 and 8, the lower attachment assembly 64 comprises a pair of stirrup members 92A, 92B, one on each side of a bicycle wheel, in this instance a rear wheel 14 (see FIG. 1). Only the left stirrup member 92A is shown in each of FIGS. 5–8, the right stirrup member 92B being a mirror image of left stirrup member 92A. Together, the stirrup members 92A, 92B provide lower mounting sites for the bilateral legs of the bicycle accessories.

Each stirrup member 92A, 92B is formed of a central body 210 with generally planar front and rear surfaces 212, 214, respectively. Attached to the front surface 212 and the rear surface 214, as with screws 220, are a front plate 216 and a rear plate 218, respectively. Each stirrup member 92A, 92B is positioned so that the front plate 216 is facing outward from the bicycle wheel for readily inserting or removing the lower apertured tips 88A, 88B and 88C of the accessory legs in the receiving slots 90A, 90B and 90C, respectively, of the stirrup members.

The stirrup members 92A, 92B are rigidly attached to rear struts 32A, 32B as shown, or to lower beams 34A, 34B, respectively. One possible attachment is illustrated, i.e. the stirrup members 92A, 92B are attached by screws 208 passed through screw holes 219 through the stirrup member 92A or 92B and through screw holes 209 in tabs 206 typically found on modern bicycles 10. As shown, the frame mount 96 is a strong strap-like member tightly passed about a rear strut 32A or 32B and firmly attached to the stirrup member by a screw 222. Frame mount 96 may be an extension of either the front plate 216 or rear plate 218 of each stirrup member 92A, 92B. In the drawings, the frame mount 96 is shown as a separate U-shaped "strap" enclosing the rear strut 32A and attached by screw 222 to each side of the stirrup member 92A. The frame mount 96 may be formed of a metal such as aluminum or a strong plastic material.

Thus, the mounting of an accessory 66, 70 or 74 in the lower attachment assembly 64 and to at least one other point on the bicycle frame 12 provides a rigid mount of the accessory, preventing significant movement forwardly, rearwardly, vertically, and laterally.

As rendered in the drawings of FIGS. 5–8, the central body 210 of a stirrup member 92A has a plurality, e.g. three receiving slots 90A, 90B and 90C which are angularly spaced in a coplanar arrangement for accepting and retaining therein the apertured tips of the accessory legs 78A, 78C and 78E. Thus, in the figures, generally vertical receiving slot 90B accepts the tip 88B of carrier leg 78C. Slot 90A accepts the tip 88A of the hitch assembly leg 78A at an angle of about 50 degrees from the horizontal. Slot 90C accepts the tip 88C of a fender leg 78E at an angle of about 15 degrees from the horizontal. However, the slots 90A, 90B, and 90C may be at any appropriate angle, and the slots may even be parallel, depending upon the leg orientation. If desired, a tip may be made non-parallel to the leg of which it is a part, but this generally results in a leg having reduced support capability. The slots and corresponding tips may be graduated in width 234 (FIG. 6), and/or in thickness 236 (FIG. 8) to enable easy insertion and removal. In the embodiment shown, the receiving slots 90A, 90B, 90C comprise elongated recesses on the rear surface 214 of the central body 210, and each utilizes the rear plate 218 as one surface of the slot. Although the stirrup members are here illustrated as having three receiving slots in each member, it should be understood that a greater or lesser number of such slots could be formed in each stirrup member, and such variations are within the scope of the invention.

Each of the internal seats 224 (FIG. 6) of the receiving slots 90A, 90B and 90C is configured to retain a short-stroke spring 226 whose purpose will be explained, infra. Each of the leg tips 88A, 88B, 88C has an aperture 136 therethrough by which the tip is retained and/or locked in its respective receiving slot 90A, 90B or 90C.

In an alternate arrangement, a short-stroke spring may be attached to each leg tip 88A, 88B, 88C and the spring 226 eliminated from the receiving slots 90A, 90B, 90C.

The general apparatus and operating principles for retaining and locking the leg tips in each of the receiving slots being the same, the apparatus relating to retaining leg tip 88A in receiving slot 90A will be described as representative of an alternate embodiment of the stirrups of the invention.

FIG. 5 shows leg tip 88A fully inserted into one of the receiving slots 90A, being forced downwardly against and depressing spring 226. A lever 240 is rotatable about axis 242 in a recess 248 within the central body 210. The recess 248 laterally intersects the receiving slot 90A such that a first end 244 of the lever 240 may be moved to a position within leg tip aperture 136 and thus prevent removal of the leg tip 88A. As shown in FIG. 8, the second end 246 of the lever 240 is movable inwardly by actuation of a pushbutton 250 by the operator's finger 252 to retract the lever's first end 244 from the aperture 136. The leg tip 88A may then be slid outwardly, upwardly in direction 254 from the receiving slot 90A. The pushbutton 250 and lever 240 are biased by a spring 252 to maintain the lever in the locking position shown in FIG. 5 except when pushbutton 250 is pushed inward to rotate the lever. The short stroke leaf spring 226 in the internal seat 224 of the receiving slot 90A biases the leg tip 88A upwardly so that when the pushbutton 250 is depressed, the tip 88A is ejected far enough in direction 254 by spring 226 to prevent the lever from reentering the leg tip aperture 136. Each pushbutton 250 is shown with an inner flange 270 which engages the inside of front plate 216, retaining the pushbutton in engagement with the second end 246 of lever 240.

Locking apparatus is provided for simultaneously locking the first ends 244 of all levers 240 within the apertures 136 of the legs to prevent unauthorized removal of the legs from the stirrup members 92A and 92B. As shown in FIG. 7, an arcuate runner strip 256 is reversibly slidable in an arcuate channel 258 within the central body 210. When in locking position 262, outwardly extending blocking protrusions 260 are positioned along the strip 256, selectively preventing any of the ends 244 of the levers from being retracted from the leg apertures 136. When the strip 256 is moved to its unlocked position 264 (FIGS. 7 and 8), the protrusions 260 of the strip 256 do not restrict lever movement, and any or all of the leg tips may be removed from the stirrup member 92A by actuating the buttons 250 to swing the levers 240, as shown in FIGS. 7 and 8. The distance through which the strip 256 slides along channel 25 is small, i.e. only enough to move between locked and unlocked positions allowing blocking and free movement, respectively of the levers 240. The strip 256 is shown as being movable by a rotatable shaft 266 having a radially extending pin 268 which engages an aperture 269 in strip 256 and moves the strip 256.

In an alternate arrangement, the shaft 266 may be replaced by a rotatable pinion gear which engages a rack on strip 256 and allows sliding of the strip by rotation of the pinion. Shaft 266 may also include a lock cylinder 272 (FIG. 5) which requires a key 135 to rotate shaft 266 and lock and unlock the leg tips relative to the stirrup members.

The runner strip 256 is seen to be readily formed of plastic, metal or other material which is relatively non-compressible under the finger pressures used on the pushbuttons 250. The runner 256 must readily slide reversibly within the arcuate channel 258.

It is reiterated that the left stirrup member 92A and right stirrup members 92B are preferably mirror images of each other. Identical stirrup members may be used on both sides of the wheel 14, but one of the stirrup members will then have its shaft 266 and pushbuttons 250 facing the bicycle wheel. The drive chain gears and closely spaced spokes of the bicycle wheel may interfere with operation of the cylinder 272 on shaft 266, and/or pushbutton manipulation. Thus, it is preferred to have the keyholes and pushbuttons on the exterior sides of the stirrup members for easy access and manipulation.

While the stirrup members 92A and 92B have been illustrated as being attached to the bicycle struts by screws and straps other means of attachment may be substituted and are within the scope of the invention. For example, the rear strut area of the bicycle frame could be manufactured with a plate or other mounting surface fixed to a strut 32A or 32B, to a beam 34A or 34B or connected between a strut and beam. The plate would be configured to receive and support a stirrup member, and the stirrup member could be attached to the plate by screws or in any other known manner. Alternatively, such plate could be configured to serve as the rear plate 218 of the stirrup member, and the remainder of the stirrup member could then be screwed or riveted to the plate. If desired non-removable screws could be utilized to deter unauthorized removal of the stirrup member from the bicycle frame.

FIGS. 9 and 10 illustrate the mounting of a pannier or saddlebag 76 to the side of a luggage carrier 70 of the invention. The luggage carrier 70 is shown as being formed of metal rod material and has elongate left and right members 104A and 104B. Extending downwardly from left elongate member 104A are a left leg 78C and a left brace 110A which is joined at its lower end to the leg 78C. An apertured tip 88B on the lower end of the left leg 78C is adapted to be inserted into and be supported by left stirrup member 92A of lower attachment assembly 64. A right leg 78D and a right brace 110B, (FIG. 1), are mirror images of the left leg 78C and brace 110A, which extend downwardly from right member 104B to right stirrup member 92B. Thus, the luggage carrier 70 is supported on the left and right sides by stirrup members 92A, 92B, respectively.

An upwardly narrowing wedge bracket 116A is shown attached to the left leg 78C and/or brace 110A, for supporting an accessory such as a pannier or saddlebag 76.

As best seen in FIG. 9, a downwardly extending hook 117 is carried by the lower legs 78C and 78D to provide a convenient attachment point for known saddlebags and panniers requiring such a hook for their attachment.

A preferred embodiment of the pannier or saddlebag 76 is shown as having a hard shell 280 and a cover 282 attached by hinges 284. Attached to the rear panel 286 is a wedge clamp 116B into which wedge bracket 116A may be inserted to support the pannier 76.

Referring now to FIG. 9, an elongated mounting member 288 is attached to the rear panel 286 of pannier 76 with posts 290. Mounting member 288 may comprise a straight rod or cylinder formed of high strength material such as e.g. aluminum alloy or reinforced plastic. The posts 290 extend upwardly from member 288 and are thus attached to the mounting member 288 to permit the member to be inserted into a cylindrical locking member 112 attached to luggage carrier 70 by arms 114.

The construction and operation of the locking member 112 are illustrated in FIGS. 12–17. In the embodiment shown, the locking member 112 comprises a cylindrical lock tube 300 having a cutaway portion 302 (FIG. 14) which is sufficiently wide to permit the mounting member 288 to be inserted or nested in the lock tube. The cutaway portion 302 is shorter than the length 304 (FIG. 9) of the mounting member 288. As best seen in FIG. 12, a portion of both ends 306A, 306B of the lock tube 300 are not cut away, but are full round. A mounting member 288 may be placed within the lock tube 300 by first inserting one end 310 (FIG. 12) of the mounting member into end 306A and then inserting the remainder of the mounting member in the tube. An end closure 308 in first end 306A prevents axial movement of the mounting member 288 therein. A tube lock device 134 is attached to the opposite end 306B of the lock tube 300. The tube lock device 134 is rotatable between an open and a closed position, and may be locked. In the closed position, the tube lock device 134 encircles and encloses end 312 of the mounting member 288 to prevent its removal from the lock tube 300.

The cutaway open faced portion 302 of the lock tube 300 generally comprises up to about one-half of the lock tube outside circumference. As shown in FIG. 13, the cutaway portion spans an angle 303 of about 150 degrees, and the inner edges 318 of the lock tube 300 may be reduced to enable the mounting member 288 to be snugly inserted therein. Preferably, the lock tube inside diameter 316 (FIG. 15) is not greater than the mounting member outside diameter 320 (FIG. 12) by more than about 10–15 percent.

The tube lock device 134 has a knob portion 322 and a partial tubular extension 324 with an inside diameter 326 (FIG. 15) slightly greater than the outside diameter 314 of the lock tube 300. As illustrated in FIG. 13, the partial tubular extension 324 has a circumference 332 extending through about 220 degrees, permitting passage of the mounting member 288 through the remaining 140 degrees when the extension 324 is in the open position, as in FIG. 14. The particular angular circumference 332 may be any value which will alternatively provide a locking position and an open position.

Referring now to FIGS. 12, 15 and 16, a cylindrical stud 330 extends from the knob portion 322 of the lock device 134 into the end 306B of the lock tube 300, and may be rotated therein. Extending axially from the stud 330 is a threaded stud end 334 having a shallow thread pitch. This stud end 334 is screwed into a threaded hole 336 in a plug 340 which is fixed within the lock tube 300 by a rivet 338 passing through the lock tube and a hole 342 in the plug. As shown in FIG. 17, the plug 340 has an end surface 344 against which a mounting member 288 is abutted when inserted into the lock tube 300. In addition, a cam ramp 346 extends about a circumferential portion 348, typically about 75 to 150 degrees, and terminates in a drop-in slot 350 with an end stop surface 352 for receiving a locking bolt 354 (FIG. 16) and preventing rotation of the tube lock device 134 relative to the lock tube 300.

A keylock cylinder 360 is connected to a worm gear 362 in the stud 330, permitting rotation of the worm gear with a key 135. A slot 364 in the stud 330 is provided for movement of a locking bolt 354 between a locked position within the stationary plug 340 (shown in FIG. 15), and an open position (FIG. 16) wholly within the slot 364. The locking bolt 354 has a tooth or teeth 356 by which the bolt may be moved parallel to axis 328 by rotation of the worm gear 362, as motivated by rotating key 135 in the cylinder 360. FIG. 15 shows the locking bolt 354 in a locked position, and FIG. 16 shows the bolt 354 in an open position enabling rotation of the knob portion 322 about the cylindrical lock tube 300.

As shown in FIGS. 15 and 16, a stop pin 366 mounted on the lock tube 300 intersects the tubular extension 324 during its rotation about the lock tube. The stop pin 366 limits rotation of the tube lock device 134 to an angle of about 360 degrees minus angle 332, (FIG. 13), or typically about 140 degrees. In practice, however, this rotational angle is increased by use of slots or indent(s) 368 (FIG. 12) in the partial tubular extension 324, enabling the tube lock device 134 to be rotated about 180 degrees. The stop pin 366 passes into the indent 368 to increase the available rotation. The slots or indents 368 may be angled slightly to accommodate the axial movement of the tube lock device 134 as the stud end 334 is rotated in the threaded hole 336 in stationary plug 340.

It should be noted that while the cam ramp 346 on the plug 340 eases the locking process, it is not needed so long as the drop-in slot 350 in the plug will accommodate the bolt 354 (see FIG. 17).

Thus, with the locking bolt 354 in a retracted position (FIG. 16), the knob portion 322 may be rotated to rotate the partial tubular extension 324 of the lock device 134 about the lock tube axis 328 between a closed position shown in FIG. 13 where cover 324 overlies the mounting member 288 (FIG. 12), and an open position shown in FIG. 14 where the mounting member 288 may be withdrawn from the tube 300. Using a key, the tube lock device 134 may be locked in the closed position to prevent unauthorized removal of one or more accessories mounted therein.

In another embodiment shown in FIG. 11, lockable container 73, here shown as a side basket, has a two-part mounting member made up of portions 370A and 370B. A first mounting member portion 370A of abbreviated length 372 is attached to the basket body 374 by connectors 375 and is shown inserted into the lock tube 300 of outboard locking member 112. The second mounting member portion 370B is also abbreviated in length 382 and is attached to the cover 380 of the container 73. Mounting member portion 370A and portion 370B may be formed of rod or tubular material and together form the mounting member which is inserted into the locking member 112 for lockable support and retention. The two-part mounting member may be retained and locked between the first end 306A of the lock tube 300 and the tube lock device 134. The tube lock device 134 is as already described, and restrains the second mounting member portion 370B in the lock tube 300. Thus, the container cover 380 may be locked in a closed position simultaneously with the locking of the container 73 to the carrier 70. In this embodiment, it is evident that the first mounting member portion 370A of the side basket 73 is fully supported by the lock tube 300 even when the cover 380 with second mounting member 370B is lifted out of the lock tube. The outer end of the portion 370A is trapped within lock tube 300 by tube portion 301. As is shown in FIG. 19, the side basket 73 and a top basket 72 may be simultaneously mounted to the carrier 70.

In a second unillustrated variation of a lockable container similar to the container 73, such container bottom 374 would be provided with an elongated first rod portion much like the rod portion 370A (FIG. 11) wherein the rod portion would have a length equal to the length of rod portions 370A plus 370B, and this first rod portion would have a semicircular cross section. Such a first rod portion could be cast, molded, or extruded as an elongated rod having a flat upper surface and a lower semicircular surface. Such a first rod portion would fit in and fill about half the volume of the lock tube 112. The lid 380 of the container would then be provided with a second rod portion having a cross section identical to the semicircular cross section of the first rod portion just described, but wherein the semicircular surface faces upward and the flat surface confronts the flat surface of the first rod portion. Such first and second rod portions would be parallel to one another. The second rod portion may have its length slightly shorter than the first rod portion it confronts and would be shortened at the end which enters the tube lock adjacent tube end 308 so that the second rod portion may be more easily fitted into the end portion 306A of the tube. If desired, the semicircular first and second rod portions need not be formed of solid rod material, and can instead consist of the upper and lower halves of a horizontal hollow rod. While it is preferred that these first and second rod portions have an overall circular outer configuration when they confront each other in the lock tube, the first and second rod portions could be defined by simple flat or other cross section configuration members which can fit within the lock tube and be lockably retained therein. All such variations are within the purview of the invention. Such variations can be used with a basket like that shown in FIG. 11 or with solid sided and lidded panniers.

Turning now to FIG. 19, another feature of the invention is shown. A carrier 70 is shown with leg 78C. An outboard locking member 112 is shown attached to the carrier 70 by connectors 114. As already described, the cylindrical lock tube 300 of outboard locking member 112 is formed of a cutaway tube having a semi-circular cross-section.

Attached to the top basket 72, preferably to a lower frame member 386 thereof by connectors 111, is a mounting trough 118 formed of tubular material having an outer diameter which fits closely to the inner surface 119, i.e. nests within the cylindrical lock tube 300. In turn, the mounting members 370A and 370B of basket 73 or mounting member 288 of pannier 76 have a diameter which fits within the mounting trough 118. Thus, a mounting trough 118 and the mounting members of multiple accessories may be concentrically mounted as shown in FIG. 19 in the same locking member 112 and locked in by tube lock device 134. In addition, either may be separately mounted and locked within the tube lock device 134.

While the figures show the top basket 72 as having mounting troughs 118 and the side panniers 76 and side baskets 73 as having the overlying mounting member, the reverse may be used, i.e. the top basket 72 may be provided with the overlying mounting members and the side panniers or baskets provided with mounting troughs. Where an accessory with a mounting trough 118 and an accessory with an overlying mounting member are both to be mounted to the bicycle, the mounting trough 118 is inserted into the cylindrical lock tube 300 first, followed by insertion of the overlying mounting member 370A into the mounting trough 118. In accordance with FIGS. 12–16, the knob portion 322 is then rotated to a locking position in which the partial tubular extension 324 encloses the second ends 388 of the mounting trough 118 and mounting member 370A and 370B (see FIG. 11) or 288. A key 135 may be inserted into the keylock cylinder 360 and rotated to move the bolt 354 into the drop-in slot 350, locking the partial tubular extension 324 in the locked position. Removal of the key prevents removal of the mounting trough 118 and the mounting member from the lock tube 300. Trough 118 and the mounting member may be removed by reversing the process.

FIGS. 20 and 21 depict prior art bicycle frame members 401 and 402 which are sometimes known in the prior art as a vertical drop out and a horizontal dropout, respectively. Each of the bicycle frame members 401 and 402 have formed therein an axle slot 404 for receiving the axle 40 of the rear wheel 14 of a bicycle 10. As can be seen from FIGS. 20 and 21, frame member 401 has an axle slot 404 which is oriented in a vertical position, whereas frame member 402 has an axle slot 404 oriented in a generally horizontal position. Each of the frame members 401 and 402 also comprise a plurality of tabs 206 which are provided with through screw holes 209 as also illustrated in FIGS. 6 and 7. The frame members 401 and 402 are arranged to be coupled between a lower beam 34 and a rear strut 32 of a bicycle frame, the frame members 401 and 402 themselves becoming an integral part of the bicycle frame 12. Each of the frame members 401 and 402 are coupled to the respective rear strut and lower beams 32, 34, by means of an upper frame attachment structure and a lower frame attachment structure 406 and 408. Also depicted in FIGS. 20 and 21 in broken line is a web 410 that is an integral part of the improved bicycle dropout frame member 400 of the present invention. The broken line representation of web 410 in FIGS. 20 and 21 is included for purposes of reference only. Applicant knows of no structure similar to web 410 in the prior art.

FIGS. 22 and 23 illustrate the bicycle frame member 400 of the present invention. As can be seen in FIGS. 22 and 23, the bicycle frame member 400 is comprised of a web 410 having a leading edge 411, a trailing edge 412, and a lower edge 413. An axle slot 404 is formed into the lower edge 413 of the web 410. The axle slot 404 depicted in FIG. 22 is oriented in a generally vertical position, similar to that illustrated in FIG. 20. Conversely, the axle slot 404 depicted in FIG. 23 is oriented in a generally horizontal position, similar to the axle slot 404 depicted in FIG. 21. The bicycle frame member 400 also comprises upper and lower frame attachment structures 406 and 408 for coupling the bicycle frame member 400 to the frame 12 of the bicycle 10. The upper and lower frame attachment structures 406 and 408 are formed integral to the leading edge 411 of the web 410. The lower frame attachment structure 408 extends forward from the leading edge 411 of the plate adjacent the lower edge 413. The upper frame attachment structure 406 extends upwardly and forwardly along the leading edge 411 of the web 410. The precise angle measured between the upper and lower frame attachment structures 406, 408 is variable depending upon the structure of the bicycle frame 12 and more particularly on the angle that exists between the rear strut 32 and the lower beam 34 that are coupled to the bicycle frame member 400. In general, it is preferred that the upper and lower frame attachment structures 406, 408 be arranged such that the axes of the rear strut 32 and the lower beam 34 will intersect with the axle 16 as it is seated within the axle slot 404. However, it must be understood that the geometric relationship between the upper and lower frame attachment structures 406 and 408, the rear strut 32 and lower beam 34, and the axle 16 may be varied to suit a particular application of the bicycle frame member 400.

As illustrated in FIGS. 24 and 28, the bicycle frame member 400 and 400A may also comprise a fillet 490 having a radius generally larger than the diameter of the lower beam and rear strut of the bicycle frame between upper and lower attachment structures 406, 408 of the frame member 400. This fillet 490 increases the inherent strength of the joint created by the frame members 400, 400A. FIG. 25 illustrates the fillet from the rear of the frame member 400.

FIG. 24 illustrates the an alternate embodiment of the bicycle frame member 400 of the present invention. The bicycle frame member 400 illustrated in FIG. 24 comprises a web 410 having a vertical axle slot 404 formed into its lower edge 413. Extending forward from the leading edge 411 of the web 410 is lower frame attachment structure 408.

The lower frame attachment structure extends forward immediately adjacent to the lower edge of the web 410 and generally in parallel relation therewith, though it is to be understood that the parallel relation with the lower edge 413 is not a requirement of the present invention. The upper frame attachment structure 406 extends upwardly and forwardly along the leading edge 411 of the web 410 at an angle of generally less than 90° from the lower frame attachment structure 406. The web 410 of the frame member 400 has disposed along its trailing edge 412 a number of attachment bores 420 although the number and arrangement of the attachment bores 402 may vary widely depending upon the application for which the frame member 400 is intended. In addition, screw holes 209 illustrated in FIGS. 1, 2, 5, and FIG. 6 are also provided upon the web 410 of the frame member 400. It is to be understood that the arrangement of the attachment bores 420 may reproduce the function of any frame member 401, 402 of the prior art in addition to providing a means for securing bicycle accessories to the frame of a bicycle which the frame members 401, 402 of the prior art may not be adapted. The benefit of the relatively large web 410 over the frame members 401, 402 of the prior art include, but are not limited to, the enhanced structural strength and rigidity inherent in the use of a large plate member in such an application, as well as the ability to secure a large number of bicycle accessories, in many different combinations, to the frame 12 of the bicycle 10 by means of the attachment bores 420.

FIG. 24 also more clearly illustrates the upper and lower frame attachment structures 406 and 408. In this embodiment the frame attachment structures 406 and 408 comprise a tubular element 416 having a slot 417 formed through its base 418, the tubular element 416 being received upon, and secured to, a projection 419 of the web 410. It can be seen that the projections 419 are integral to, and project from, the web 410. The tubular elements 416 of the upper and lower frame attachment structures 406, 408 are received upon the projections 419 by means of the slot 417 and the respective bases 418 of the tubular elements 416. The tubular elements 416 are sized to be received within the bores of the tubing from which the rear strut 32 and the lower beam 34 are fashioned. The bicycle frame member 400, having its upper and lower frame attachment structures 406, 408 received within the rear strut and lower beam 32, 34 respectively, is permanently attached to the frame 12 by means of an adhesive, a welding operation, or more preferably, a brazing operation. The exact means whereby the bicycle frame member 400 would be secured to the frame 12 of a bicycle 10 depends upon the type of material from which the bicycle frame 12 is manufactured, e.g. carbon-fiber composites, steel, or aluminum alloys. While it is preferred to attach the bicycle frame member 400 of the present invention to the frame 12 of a bicycle 10 at the time of initial manufacture of the bicycle, it is to be understood that the frame member 400 may be used as a replacement part as well.

Another embodiment of upper and lower attachment structures 406, 408 (not shown) excludes the tubular elements 416 in favor of extending the projections 419 of the web 410. The projections 419 of this alternate embodiment would then be received within in slots (not shown) in the ends of the rear strut and lower beam 32, 34. This alternate embodiment would not be well suited for use with rear struts or lower beams 32, 34 made of composite materials but would be well suited for use with rear struts or lower beams 32, 34 made of steel or aluminum. The frame member 400 of this alternate embodiment would be secured to the rear struts and lower beams 32, 43 by means of a welding or brazing operation.

While the frame member 400 illustrated in FIG. 24 is perfectly suited for having bicycle accessories bolted, brazed, or welded thereto, a structure for removably attaching bicycle accessories to the web 410 is also herein disclosed. The stirrup members 92A and 92B of the parent application, are structurally very similar to the stirrup members 430A and 430B of the present invention, and like reference numerals will be utilized to indicate like elements.

Figure 34:
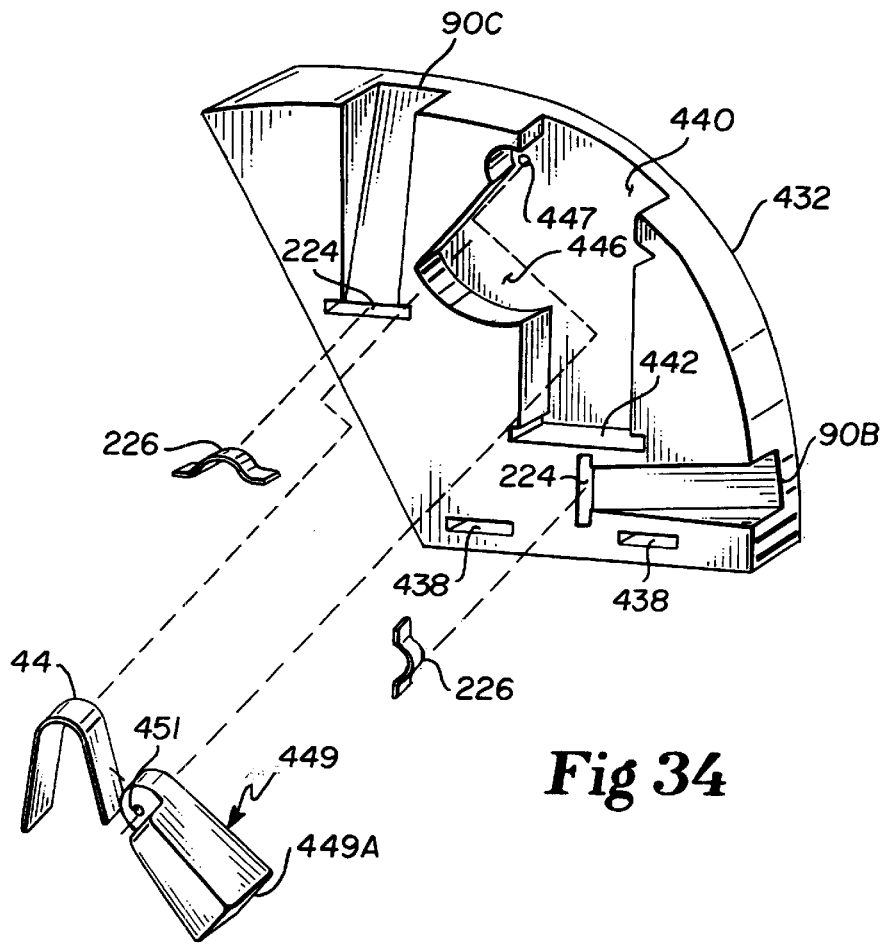
FIG. 34 is an exploded view of the central body illustrating the receiving slots, the hitch slot, and the placement of the short stroke springs and the latch within the central body.
Figure 35:
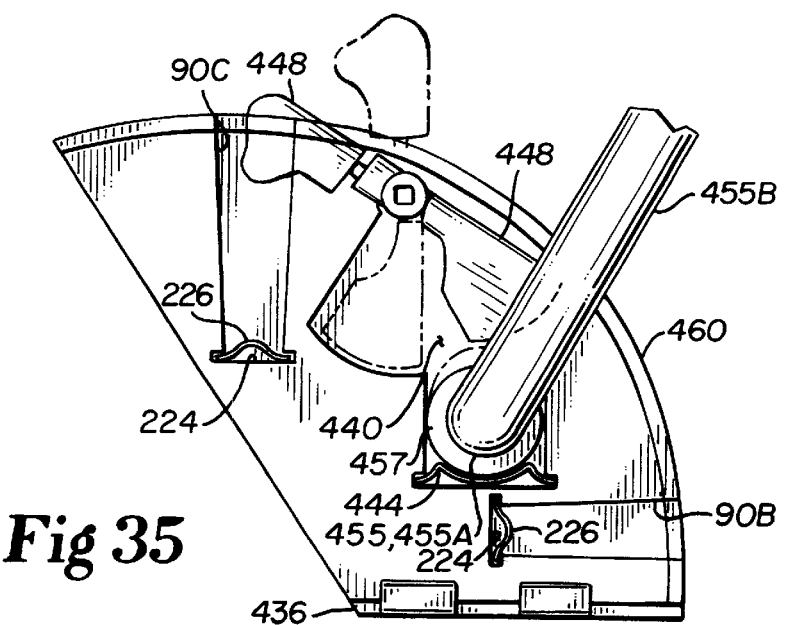
FIG. 35 is a partial cut-away view of the central body illustrating how the latch operates to retain the towing hitch apparatus within the hitch slot.

FIG. 26 depicts a central body 432 that is similar in structure and function to the central body 210 illustrated in FIGS. 5–8. As can be seen in FIG. 26, the central body 432 has a leading edge 411, a trailing edge 412, and a lower edge 413, which are complementary to the similarly designated edges of the web 410. The central body 432 is provided upon its trailing edge with a pair of receiving slots 90B and 90C. It is to be understood that though only two receiving slots have been disclosed as part of the structure of the central body 432, more or fewer receiving slots may be provided depending upon the size and geometry of the receiving slots or the central body 432 itself The receiving slots 90B and 90C of central body 432 are arranged to receive the apertured tips of accessory legs 78 in the same manner as described above. Each of the receiving slots 90B and 90C has at its bottom an internal seat 224 which is arranged to receive a short stroke spring 226 as illustrated in FIGS. 34 and 35. The purpose and structure of the short stroke springs 226 are identical to those described for use in conjunction with the central body 210.

Referring to FIGS. 5–8, it can be seen that in order to retain the apertured tips of the accessory legs 78, each of the receiving slots 90B and 90C has been provided with a lever 240 that is rotatable about axes 242 in a recess 248 within the central body 430. The recess 248 laterally intersects the receiving slots 90B and 90C such that a first end 244 of the lever 240 may be moved to a position within leg tip aperture 136 and thus prevent removal of the leg tip 88A. Push buttons 250 are arranged such that by applying pressure thereto, as by a user's finger 252, the push button may actuate the lever 240 so as to permit the removal of the accessory legs 78 from the receiving slots 90B and 90C. In order to simplify the illustration of the frame members 400, 400B of the present invention, levers 240 and their associated structures have been omitted from FIGS. 20–40. Please refer to FIGS. 5–8 and associated text for a description of the structure and function of the levers 240.

The central body 432 is also provided with attachment bores 420A which are complementary with attachment bores 420 of web 410. Central body 432 is generally secured to web 410 by means of bolts or other fasteners passed through bores 420A and bores 420 in a well known manner. Alternatively, the central body 432 may be welded or brazed to the web 410.

The central body 432 is also provided with a hitch slot 440 having an internal seat 442 arranged to receive and retain a short stroke spring 444, the spring 444 being illustrated in FIG. 35. In communication with the hitch slot 440 and with the trailing edge 412 of the central body 432 is a latch recess 446. Latch recess 446 is arranged to receive latching mechanism 448 illustrated in FIGS. 34, 35, and 38, 39. The latch mechanism 448 functions to selectively retain the insertable end 456 of a towing hitch apparatus 454. The insertable end 456 of the towing hitch apparatus 454 is illustrated in FIGS. 36 and 37. In addition, with reference to FIG. 40, it is to be understood that he hitch slot 440 may be located forward of the rear strut 32 and between the rear strut 32 and the lower beam 34 on a suitably modified central body (not shown) mounted over the augmented plate 410 depicted in the Figure.

Figure 31:
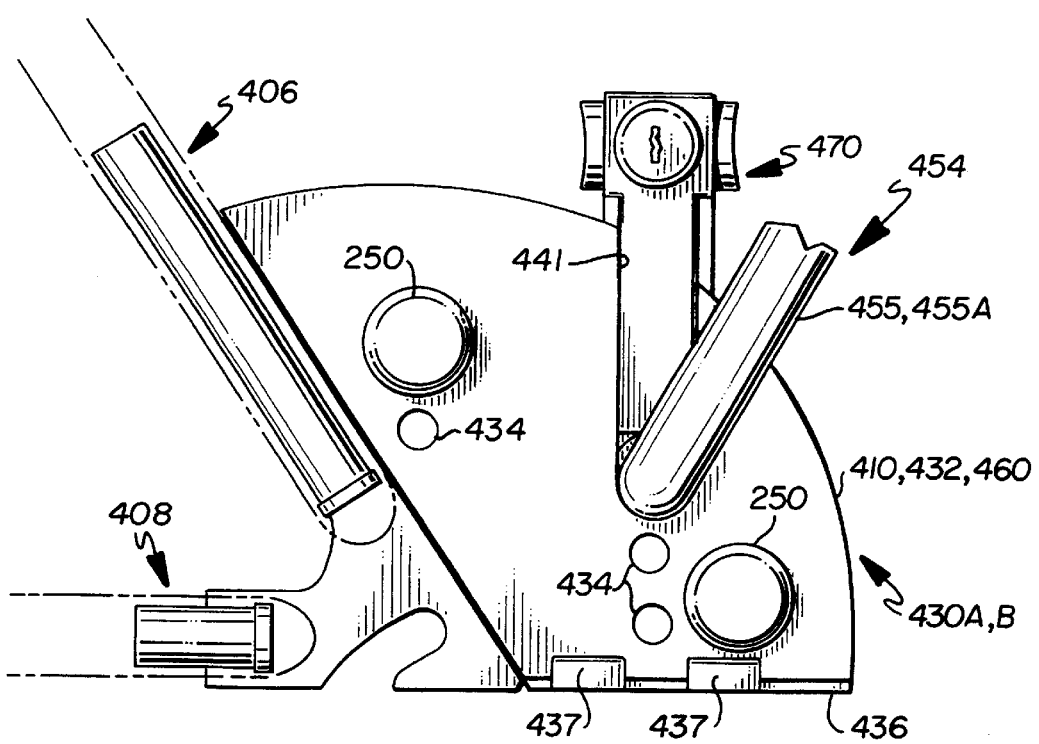
FIG. 31 is a side view of an alternate embodiment of the improved dropout frame member having a central body and cover coupled thereto, and further having a towing hitch apparatus received in a hitch slot formed in the central body and a locking mechanism inserted into the hitch slot above the towing hitch apparatus so as to lock the towing hitch apparatus into the hitch slot.

Referring now to FIG. 27, a cover 460 may be seen to be mounted over the central body 432. The cover 460 is more clearly illustrated in FIGS. 32 and 33 and a second embodiment of the cover 460 is illustrated in FIG. 31. With reference then to FIGS. 27, 31, 32 and 33, the cover 460 can be seen to be comprised of a cover plate 462 having the same general shape as the central body 432 and the web 410. The trailing edge 412 of the cover plate 462 has formed thereto a lip 463 which extends normal to the cover plate 462 so as to cover the entire length of the trailing edge 412 of the central body 432 when the cover plate 462 is positioned over the central body 432. The lip 463 of the cover 460 in turn has extending normal thereto from the edge opposite the cover plate 462 a retaining plate 464, which, in conjunction with the lip 463 and the cover plate 462 forms a channel 461 sized to receive the trailing edge 412 of the central body 432. The cover plate 462 has formed therein a hitch retaining slot 441 located on the cover plate 462 in registration with the hitch slot 440 of the central body 432. The hitch retaining slot 441 is contiguous with a slot opening 443 formed through the lip 463 of the cover 460 which permits communication between the exterior of the stirrup members 430A, 430B and the hitch slot 440 of the central body 432 of each of the stirrup members. The slot opening 443 is sized so as to permit the entry of the insertable end 456 of the towing hitch apparatus 454 into the hitch slot 440. The lip 463 of the cover 460 also has formed therein apertures 465 which permit access to the receiving slots 90B, 90C.

FIG. 27 also illustrates the position of the buttons 250 which actuate the levers 240 to release the accessory legs 78 from the receiving slots 90B and 90C. In addition, FIG. 27 illustrates a number of drain holes 434 formed into the cover 460 which permit water and other foreign materials to exit the receiving slots 90B, 90C and hitch slot 440. This prevents the mechanisms housed between the web 410 and the cover 460 from becoming unusable due to contamination.

FIGS. 27, 31, 15 and 16 illustrate a bottom plate 436 which is secured to the lower edge of the cover 460 and central body 432 so as to secure the cover 460 to the central body 432. The bottom plate 436 also prevents water or foreign objects from entering the receiving slots 90B, 90C or hitch slot 440 and prevents tampering with the mechanisms of the stirrup members 430A and 430B. Bottom plate 436 is secured to the stirrup member 430A, 430B by means of a pair of tabs 437 which are arranged to be inserted into slots 438 formed through the cover 460 and the central body 432. Screws 439 are passed through screw holes 439A into complementary screw holes (not shown) formed in the lower edge of the central body 432.

The structure of the towing hitch apparatus 454 is illustrated in FIGS. 36 and 37. The towing hitch apparatus 454 comprises a bar 455 which connects the insertable end 456 of the towing hitch apparatus to the cart or trailer 68 to be towed. The bar 455 extends from the cart or trailer 68 located behind the bicycle to the stirrup assemblies 430. Depending upon the nature of the item being towed, the size of the load being towed or the terrain upon which the load is being towed, the towing hitch apparatus 454 may be provided with two bars 455 that connect the trailer 68 to both stirrup members 430A and 430B. Alternatively and preferably, the trailer 68 will be provided with a bar 455 which will be connected to only one of the stirrup members 430A or 430B. The longer shaft 455A of the bar 455 extends between the trailer 68 and the bicycle 10. The shaft 455A as illustrated in FIGS. 36 and 37 has a 90° bend such that portion 455B of the bar 455 will be positioned substantially normal to the stirrup member 430A or 430B to which the towing hitch apparatus 454 will be secured. However, it must be understood that portion 455A of shaft 455 may be formed in any geometric shape necessary to connect the insertable end 456 of the towing hitch apparatus 454 with the trailer 68 being towed behind the bicycle. Portion 455B of bar 455 terminates in a retaining cap 457. The structure of the retaining cap 457 is preferably freely rotatable upon the portion 455A of bar 455 and may be a bearing as depicted in FIG. 36. Slot opening 433 in the lip of the cover 460 is sized to receive the retaining cap 457. Hitch retaining slot 441 formed in the cover plate 462 is sized to receive portion 455B of the bar 455 but is smaller than retaining cap 457 and thereby retains the insertable end 456 within the hitch slot 440 when the insertable end 456 is received therein.

Referring to FIGS. 32, 34, 35, 38, and 39, the latching mechanism 448 can be seen to be comprised of a latch 449 having a distal end 449A which rotates about a pivot point 450 comprised of a non-circular bore 451 which extends substantially through the latch 449 at pivot point 450 and a pivot pin 452 which extends from the latch at its pivot point 450 opposite the non-circular bore 451. The latch mechanism 448 is further comprised of a latch handle 451 which may be threaded into a bore 452 of the cover 460. The latch handle 451 is of a type well known in the art which is capable of locking against rotation, a non-circular stem 453 thereof that is received in non-circular bore 450A of the latch 449. The latch 449 is secured within the latch recess 446 between the cover 460 and the web 410 by means of the non-circular stem 453 of latch handle 451 and the pivot pin 450B which is itself received within a blind bore 447 formed into the web 410. Therefore, it is to be understood that by rotating the latch handle 451, the latch 449 may be moved between a first open position in which the latch is well within the confines of the latch recess 446 and a second closed position, in which the latch 449 is disposed within the hitch slot 440, thereby preventing the insertable end 456 of the towing hitch apparatus from being removed from the stirrup member 430A, 430B. As bias spring 445 is positioned between the central body 432 and the latch 449 within the latch recess 446, the latch mechanism 448 is generally biased to the closed position. To remove the insertable end 456 from the hitch slot 440, one need only rotate the latch handle 451 in a clockwise direction to bring the latch mechanism 448 to its open position. Short stroke spring 444 will then act to eject the insertable end 456 of the towing hitch apparatus from the hitch slot 440. If it is desired to maintain the latch mechanism 448 in its open position, the latch handle 451 may be manipulated so as to lock the latch 449 in its open position.

FIG. 31 illustrates the insertable end 456 of the towing hitch apparatus 454 received within the hitch slot 440 of the stirrup assembly 430A or 430B. In order to lock the towing hitch apparatus 454 to the bicycle frame 12, a locking mechanism 470 may be provided as shown. The locking mechanism 470 inserts into the hitch slot 440 through the hitch slot opening 443 and locks into this position by means of a suitable lock structure (not shown) within the locking mechanism 470. The lock structure of the locking mechanism 470 may be actuated by a key, combination or by any other suitable structure or method. A suitable locking mechanism 470 can be adapted for use with any of the embodiments of the frame member 400 disclosed herein.

FIG. 35 illustrates the insertable end 456 of the towing hitch apparatus 454 received within the hitch slot 440 of the central body 432. In FIG. 35, the retaining cap 457 is illustrated as having depressed the short stroke spring 444 retained within the internal seat 442 of the hitch slot 440. Short stoke spring 444 aids in removing the insertable end 456 of the towing hitch apparatus 454 from the hitch slot 440. The latching mechanism 448 is shown in its closed position in solid lines and in its open position in broken lines in FIG. 35.

Figure 30:
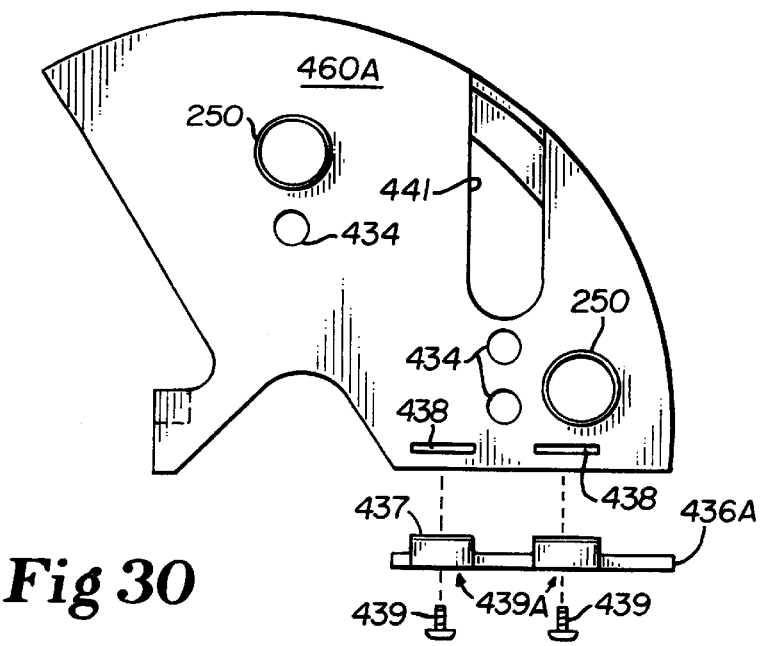
FIG. 30 is a fragmentary view of the central body of the embodiment of FIG. 28 illustrating a cover coupled to the central body.

FIGS. 28–30 illustrate an alternate embodiment of the frame member 400. In this embodiment, the web 410 and the central body 432 have been combined to form a frame member 400A having a central body 432A integral to the web 410. It is preferred that the integral central body 432A be formed from the same material as the web 410 and upper and lower frame attachment structures 406, 408, e.g. steel or aluminum, though it is not inconceivable that the integral body 432A will be formed from a composite material or a high strength plastic material. By incorporating the central body 432 into the web 410 it is hoped that the manufacture of the stirrup assemblies 430A, 430B may be simplified. The frame member 400A may be cast or machined in a single operation, removing the need to fasten a discrete central body 432 to the web 410. Note that the attachment bores 420, 420A and holes 209 are omitted in this embodiment. In all other aspects, the frame member 400A functions in the same manner as does the frame member 400 combined with the central body 432. Similarly, the cover 460A of FIG. 30 is identical in function to cover 460 and differs only to the extent necessary to accommodate the contours of the integral body 432A. Bottom cover 436A, as with cover 460A, has been adapted to fit the integral body 432A but is otherwise identical in function to bottom cover 436.

Figure 40:
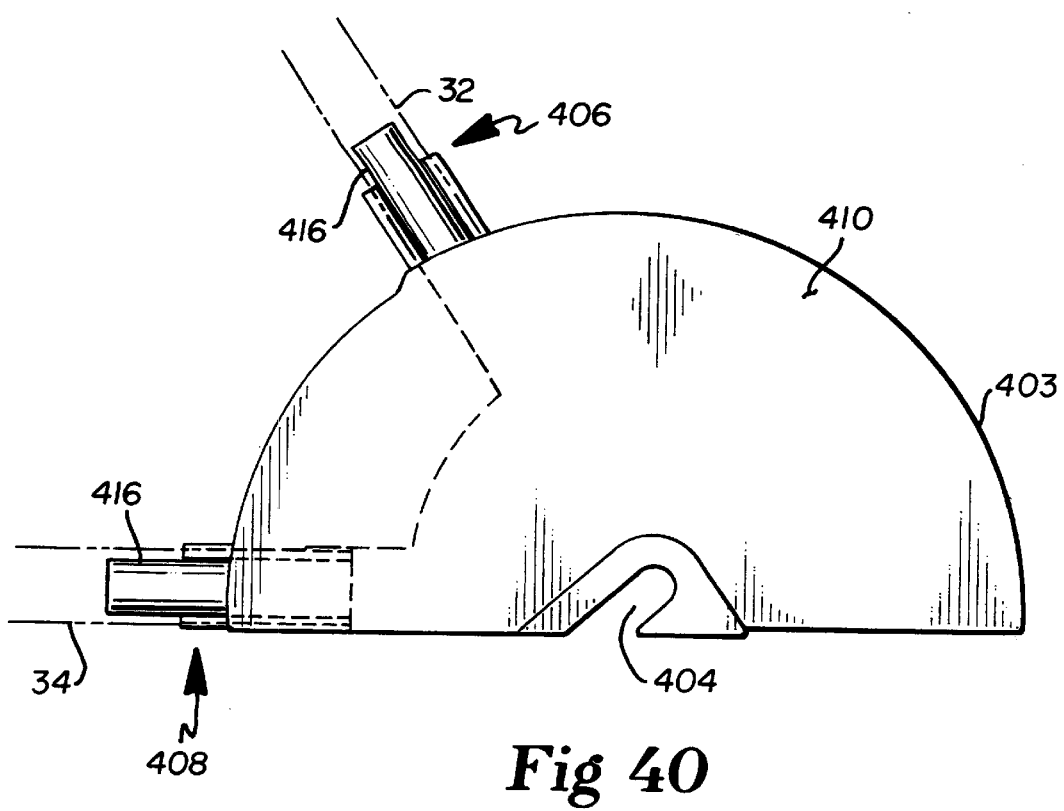
FIG. 40 is a side view of an alternate embodiment of the improved dropout frame member intended for use where the bicycle frame would be subjected to high degrees of stress.

FIG. 40 illustrates another alternate embodiment of frame member 400. Frame member 400B is an augmented version of frame member 400 in that the web 410, in this embodiment designated as web 410B, has been increased in size to the point where it sweeps approximately 180° about axle slot 404. The increased size of the web 410B increases the stiffness of frame member 400B and potentially permits more bicycle accessories to be mounted thereto. It is anticipated that frame member 408 will be utilized in conjunction with bicycles 10 intended for heavy towing and other strenuous work activities.

DETAILED DESCRIPTION OF THE PREFERRED EMBODIMENTS

Figure 41:
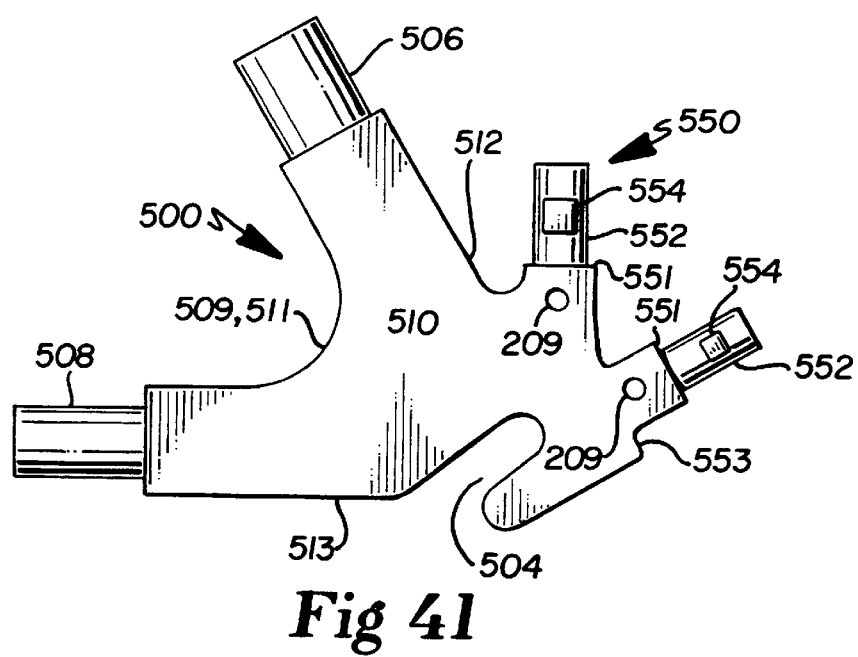
FIG. 41 is a side view of an improved dropout frame member having accessory mounting studs.
Figure 42:
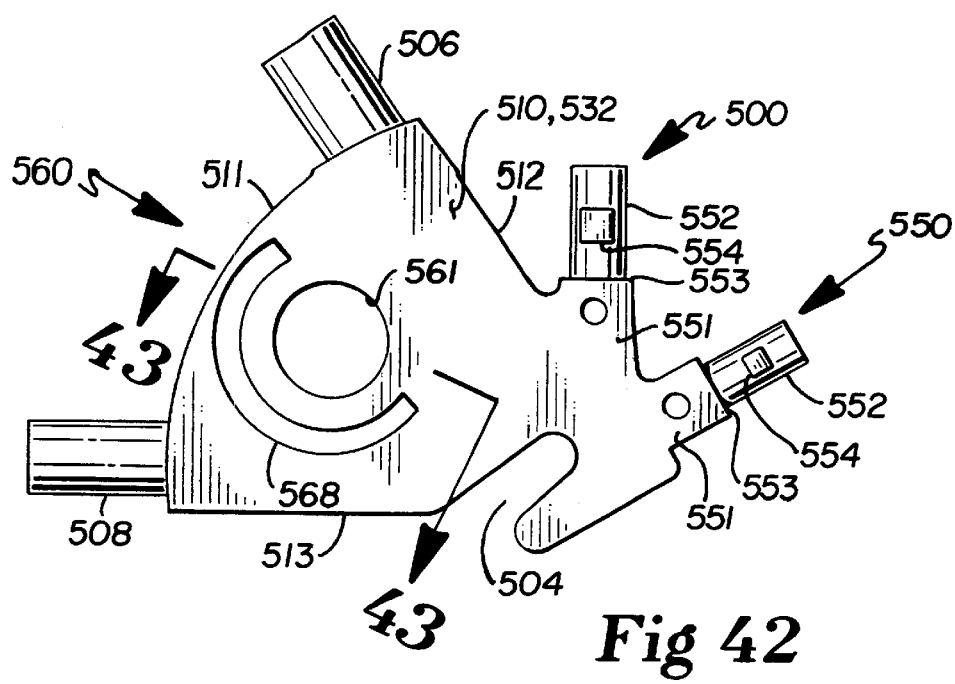
FIG. 42 is a side view of the improved dropout frame member of FIG. 41 further comprising a towing hitch structure.
Figure 43:
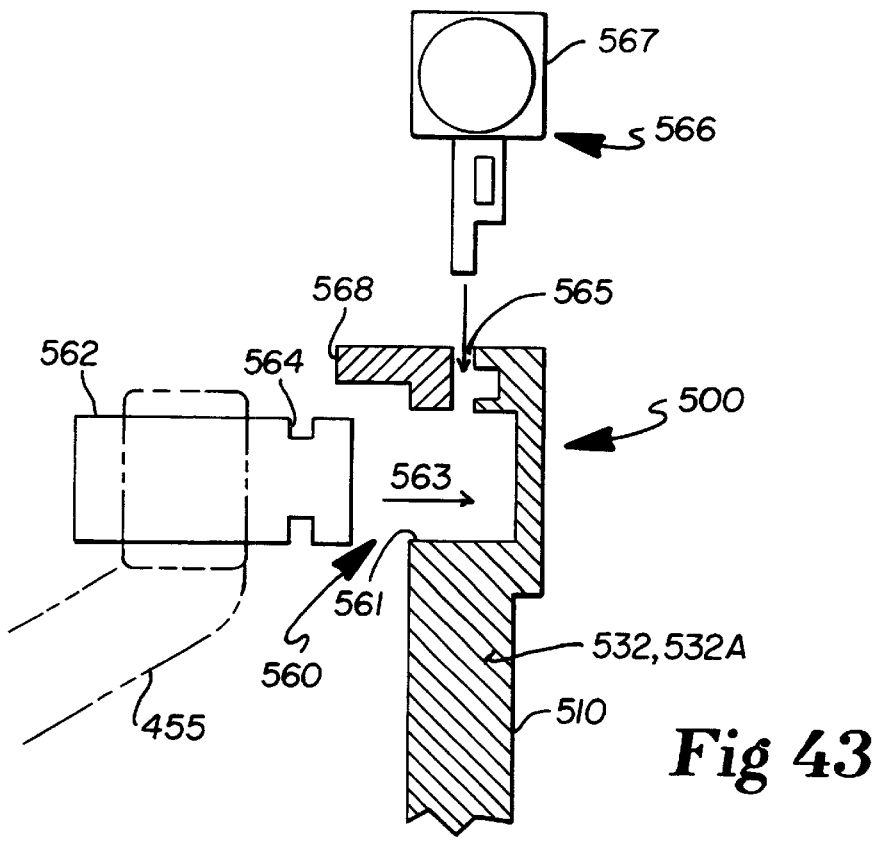
FIG. 43 is a partial cross section of the towing hitch structure as viewed along cutting lines 43—43 of FIG. 42; and, FIG. 44 is a side view of an improved dropout frame member having a towing hitch structure formed integral thereto.
Figure 44:
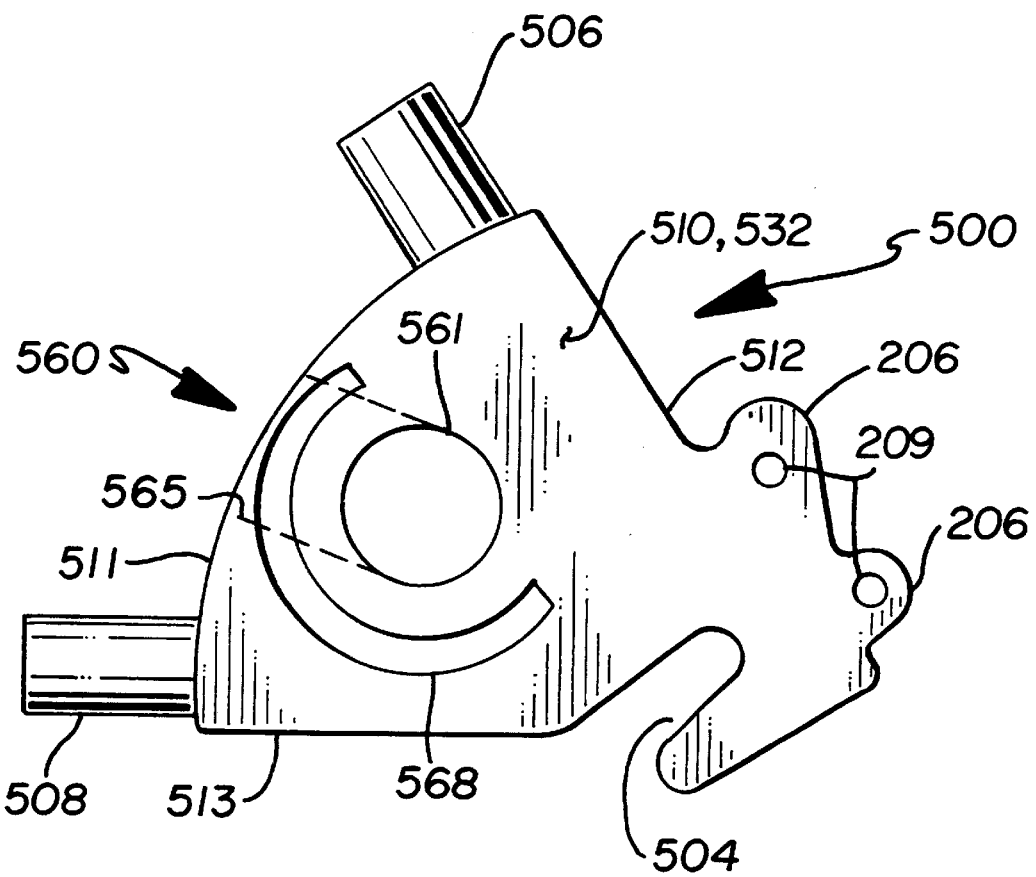

FIGS. 41–44 illustrate various embodiments of a dropout frame member 500 constructed according to the present invention. As can be seen in FIG. 41, the bicycle frame member 500 is comprised of a web or plate 510 having a leading edge 511, a trailing edge 512, and a lower edge 513. An axle slot 504 is formed into the lower edge 513 of the plate 510. The axle slot 504 depicted in FIGS. 41, 42, and 44 is oriented in a generally vertical position, similar to that illustrated in FIG. 20. The bicycle frame member 500 also comprises upper and lower frame attachment structures 506 and 508 for coupling the bicycle frame member 500 to the strut 32 and beam 34 of the frame 12 of the bicycle 10. In the preferred embodiment illustrated in FIG. 41, the leading edge 511 between the upper and lower frame attachment structures 506, 508 is a large radius fillet 509. The upper and lower frame attachment structures 506 and 508 are formed integral to the leading edge 511 of the web 510. The lower frame attachment structure 508 extends forward from the axle slot 504 adjacent the lower edge 513 and the upper frame attachment structure 506 extends upwardly and forwardly along the axle slot 504. The precise angle measured between the upper and lower frame attachment structures 506, 508 is variable depending upon the structure of the bicycle frame 12 and more particularly on the angle that exists between the rear strut 32 and the lower beam 34 that are coupled to the bicycle frame member 500. In general, it is preferred that the upper and lower frame attachment structures 506, 508 be arranged such that the axes of the rear strut 32 and the lower beam 35 will intersect with the axle 16 as it is seated within the axle slot 504. However, it must be understood that the geometric relationship between the upper and lower frame attachment structures 506 and 508, the rear strut 32 and lower beam 35, and the axle 16 may be varied to suit a particular application of the bicycle frame member 500.

In order to removably secure to the bicycle 10 accessories such as a top basket 72, side baskets 73, panniers or saddlebags 76, wheel fenders 74, and lights or reflectors (not shown), the frame member 500 has been provided with a pair of accessory mounting studs 550. These studs 550 are substantially identical and extend upwardly and rearwardly from the trailing edge 512 of the plate 510 in substantially the same location as the through screw holes 209 in tabs 206 typically found on prior art bicycle frame members 401 and 402 such as those illustrated in FIGS. 20–21. Mounting studs 550 each comprise a base 551 that extends from the trailing edge 512 of the plate 510. Mounted upon each base 551 is a stem 552. The stems 552 of the mounting studs 550 are preferably cylindrical but may also be square, hexagonal, oval, or any other useful shape. The only requirement as to the shape of the stems 552 is that the lower end 88 of a corresponding accessory leg 78 must be formed so as to releasably engage the stem 552. In addition, the stems 552 are preferably solid and are arranged to be received in complementary bores or cavities (not shown) formed in the lower ends 88 of the elongate accessory legs 78. A shoulder or radius 553 is formed between the stem 552 and base 551 of each mounting stud 550 to limit the distance that the lower end 78 of the accessory legs 88 may be seated over the stem 552 of the mounting stud 550. An alternative structure for the mounting studs 550 comprises a hollow stem 552 having a cavity (not shown) formed therein to receive an appropriately shaped lower end 88 of an elongate accessory leg 78.

A retaining mechanism 554 is provided upon each of the mounting studs 550 to releasably secure the accessory legs 78 thereto. One embodiment of the retaining mechanism 554 may be a spring urged ball or rod seated within a bore positioned in the side of a solid mounting stud 550 to engage a hole bored through the side wall of a hollow lower end 88 of an accessory leg 78 received thereover. Alternate embodiments of the retaining mechanism 554 may comprise a retaining bolt, a cotter pin, or a keyed locking mechanism. Flat lower ends 88 of the accessory legs 78 as illustrated in FIGS. 5–8 may also be adapted for use with a mounting stud 550 having a relatively flat aperture or cavity formed therein. Alternatively, the retaining mechanism 554 may be mounted on the lower ends 88 of the accessory legs 78 so as to engage a detent or similar structure on the mounting stud 550. The precise structure of the retaining mechanism 554 is not important so long as the lower end 88 of the accessory legs 78 may be releasably and reliably secured to the mounting studs 550 emanating from the plate 510 of the bicycle drop out frame member 500. It may also be advantageous to provide through screw holes 209 through the plate 510 on or adjacent to the bases 551 of the mounting studs 550. These screw holes 209 would allow additional accessories, or accessories not adapted to utilize the mounting studs 550, to be attached to the frame 12 of the bicycle 10. As can be seen in the Figures, the mounting studs 550 are shorter than the radius of the wheel of the bicycle that is mounded in the frame member 500.

As described above in conjunction with FIGS. 35–38, it may also be advantageous to provide the bicycle dropout frame member 500 with a towing hitch retention structure 560. In embodiments of the bicycle dropout frame member 500 comprising a hitch retention structure, the web 510 will span the arc between the upper and lower frame attachment structures 506 and 508. Preferably, the towing hitch structure 560 is formed integral to the plate or web 510 between the upper and lower frame attachment structures 506 and 508 that secure the dropout frame member 500 to the struts 32 and beams 34. The plate or web 510 of the present invention is constructed similar to the web 410. As can be seen from FIG. 43, the towing hitch structure 560 requires the web 510 to have a substantial thickness. The thickness of the web 510 can be built up by bolting or welding thereto a central body 532 similar to the central body 432 described above and illustrated in FIG. 26. Alternatively, the web 510 can have formed integral thereto a central body 532A such as the central body 432A also described above and illustrated in FIG. 28.

Referring now to FIG. 43, the towing hitch structure 560 comprises a bore 561 formed in the central body 532, 532A. The stopped bore 561 extends inwardly from the exterior surface 533 of the central body 532, 532A and does not pass through the central body 532, 532A. The bore 561 is sized to receive therein a hitch pin 562 which is secured in a known manner to the bar 455 of a towing hitch apparatus 454 used to tow a cart or trailer behind the bicycle 10. The hitch pin 562 is preferably cylindrical and rotatable with respect to the bar 455 of the towing hitch apparatus 454 but can be of any suitable shape, provided, of course that the stopped bore 561 is arranged and constructed to receive and retain the hitch pin 562 therein. A collar 568 partially encircles the perimeter of the bore 561 on the exterior surface 533 of the central body 532, 532A. The collar 568 aids in guiding the hitch pin 562 into the bore 561 and also prevents moisture and other contaminants from entering the bore 562.

The hitch pin 562 has a groove 564 formed around the distal end 563 thereof for retaining the pin 562 in the bore 561. The groove 564 is located upon the pin 562 so that when the pin 562 is received in the bore 561, the groove 564 is aligned with a locking channel 565 that extends through the central body 532, 532A from its leading edge 511 to the bore 561. A key 566 may be inserted through the locking channel 565 to engage the groove 564 in the distal end 563 of the pin 562, thereby preventing the pin 562 from backing out of the bore 561. The key 566 may be retained in the locking channel 565 by a friction fit with the interior walls of the channel 565 or by means of a latching mechanism or lock mechanism 567. FIG. 43 illustrates a key 566 that is completely removable from the locking channel 565. However, it must be understood that the key 566 may be adapted to be slidable within the locking channel 565 without being removable therefrom.

The bicycle dropout frame member 500 of the present invention is preferably configured so as to combine the mounting studs 550 and the towing hitch structure 560 as illustrated in FIG. 42. Alternatively, frame member 500 may omit the mounting studs 550 as illustrated in FIG. 44 and incorporate only the towing hitch structure 560. In FIG. 44 the bicycle dropout member 500 utilizes the simple through screw holes 209 in tabs 206 that prior art bicycle dropouts use to attach accessories to a bicycle 10. In addition, as illustrated in FIG. 41, the mounting studs 550 may be employed as an integral part of a bicycle dropout frame member 500 without the towing hitch structure 560. Bicycle dropout frame members 500 incorporating either or both of the towing hitch structure 560 and mounting studs 550 may be secured to the frame 12 of a bicycle 10 on either or both sides of the bicycle.

The present invention provides many major benefits. A multiplicity of accessories, in a variety of combinations, may be lockably attached to the rear and/or front of a bicycle. Attachment and removal is easy and fast and changing bicycling requirements may be quickly accommodated. In addition, the apparatus is adaptable to nearly all bicycles presently being made.

It is anticipated that various changes, variations and modifications may be made in the construction, arrangement, operation and method of construction of the invention disclosed herein without departing from the spirit and scope of the invention as defined in the following claims.

What is claimed is:

1. A bicycle dropout frame member comprising:
   a plate having a slot for receiving a bicycle wheel axle;
   a least one frame attachment structure, said frame attachment structure extending from said plate for securing said plate to a frame of a bicycle; and,
   an accessory mounting post extending from said plate of said bicycle dropout frame member for attaching a bicycle accessory to said bicycle, said mounting post having a shoulder formed at the base thereof so as to limit the insertion of the mounting post into a mating cavity in the end of the accessory leg, said mounting post being further constructed and arranged to receive and retain thereover an accessory leg.

2. The bicycle dropout frame member of claim 1 wherein said mounting post further comprises a retaining mechanism for securely and releasably retaining the accessory leg on the mounting post.

3. A bicycle dropout frame member comprising:
   a plate having a slot for receiving a bicycle wheel axle;
   a first and a second frame attachment structure, each of said frame attachment structures extending from said plate for securing said plate to a bicycle frame, said plate spanning the region between said first and second frame attachment structures; and,
   a towing hitch structure for towing a trailer behind a bicycle that is formed integral with said plate in said region between said first and second frame attachment structures.

4. The bicycle dropout frame member of claim 3 further comprising:
   an accessory mounting post extending from the plate of the bicycle dropout frame member for attaching a bicycle accessory to the bicycle.

5. A bicycle dropout frame member comprising:
   a plate having a slot for receiving a bicycle wheel axle;
   a first and a second frame attachment structure, each of said frame attachment structures extending from said plate for securing said plate to a bicycle frame, said plate spanning the region between said first and second frame attachment structures;
   a towing hitch structure for towing a trailer behind a bicycle that is formed integral with said plate in said region between said first and second frame attachment structures; and,
   an accessory mounting post extending from said plate of the bicycle dropout frame member for attaching a bicycle accessory to the bicycle.

6. The bicycle dropout frame member of claim 5 wherein said mounting post further comprises a retaining mechanism for securely and releasably retaining the accessory leg on the mounting post.

7. A bicycle dropout frame member comprising:
a plate having a slot for receiving a bicycle wheel axle;
a first and a second frame attachment structure, each of said frame attachment structures extending from said plate for securing said plate to a frame of a bicycle; and,
at least two accessory mounting post extending from said plate of said bicycle dropout frame member for attaching a bicycle accessory to said bicycle.

8. The bicycle dropout frame member of claim 7 wherein each of said mounting posts further comprises a retaining mechanism for securely and releasably retaining the accessory legs on the mounting posts.

9. A bicycle dropout frame member comprising:
a plate having a slot for receiving a bicycle wheel axle, wherein said plate spans a region between said first and second frame attachment structures, said plate spanning said region between said first and second frame attachment structures further comprising a towing hitch structure for towing a trailer behind a bicycle that itself comprises a bore for receiving a hitch pin, said bore being formed in said plate spanning said region between said first and second attachment structures, a locking channel formed through said plate from a leading edge of said plate to said bore, said locking channel allowing the insertion therethrough of a key that engages a groove formed around said hitch pin to releasably retain said hitch pin in said bore;
a first and a second frame attachment structure, each of said frame attachment structures extending from said plate for securing said plate to a frame of a bicycle; and,
an accessory mounting post extending from said plate of said bicycle dropout frame member for attaching a bicycle accessory to said bicycle.

10. The bicycle dropout frame member of claim 9 wherein said key is lockable within said locking channel.

11. A locking pin for securing a tow hitch pin in a towing hitch structure, the towing hitch structure being formed in a plate having a slot for receiving a bicycle wheel axle and first and second frame attachment structures extending therefrom, said plate spanning the region between said first and second frame attachment structures and wherein the towing hitch structure itself comprises a bore for receiving the tow hitch pin formed in said plate in said region between said first and second attachment structures and a locking channel that is formed through said plate from a leading edge of said plate to said bore, said locking channel being constructed and arranged for the insertion therein of the locking pin, the locking pin being constructed and arranged to engage a groove formed around said tow hitch pin to releasably retain said tow hitch pin in said bore.

12. The locking pin for securing a tow hitch pin in a towing hitch structure of claim 11 wherein said locking pin further comprises a locking mechanism.

13. A bicycle dropout frame member comprising:
a plate having a slot for receiving a bicycle wheel axle;
a first and a second frame attachment structure; each of said frame attachment structures extending from said plate for securing said plate to a bicycle frame, said plate spanning the region between said first and second frame attachment structures; and,
a towing hitch structure for towing a trailer behind a bicycle that is formed integral with said plate in said region between said first and second frame attachment structures, the towing hitch structure itself comprising:
a bore for receiving a hitch pin formed in said plate in said region between said first and second attachment structures and a locking channel formed through said plate from a leading edge of said plate to said bore, said locking channel allowing the insertion therethrough of a key that engages a groove formed around said hitch pin to releasably retain said hitch pin in said bore.

14. A bicycle dropout frame member comprising:
a plate having a slot for receiving a bicycle wheel axle;
a first and a second frame attachment structure, each of said frame attachment structures extending from said plate for securing said plate to a bicycle frame, said plate spanning the region between said first and second frame attachment structures;
an accessory mounting post extending from the plate of the bicycle dropout frame member for attaching a bicycle accessory to the bicycle; and,
a towing hitch structure for towing a trailer behind a bicycle that is formed integral with said plate in said region between said first and second frame attachment structures, said towing hitch structure itself comprising:
a bore for receiving a hitch pin formed in said plate in said region between said first and second attachment structures and a locking channel formed through said plate from a leading edge of said plate to said bore, said locking channel allowing the insertion therethrough of a key that engages a groove formed around said hitch pin to releasably retain said hitch pin in said bore.

15. A bicycle dropout frame member comprising:
a plate having a slot for receiving a bicycle wheel axle;
a first and a second frame attachment structure, each of said frame attachment structures extending from said plate for securing said plate to a bicycle frame, said plate spanning the region between said first and second frame attachment structures;
a towing hitch structure for towing a trailer behind a bicycle that is formed integral with said plate in said region between said first and second frame attachment structures; and,
at least two accessory mounting posts extending from said plate of the bicycle dropout frame member for attaching a bicycle accessory to the bicycle.

16. A bicycle dropout frame member comprising:
a plate having a slot for receiving a bicycle wheel axle;
a first and a second frame attachment structure, each of said frame attachment structures extending from said plate for securing said plate to a frame of a bicycle;
an accessory mounting post extending from said plate of said bicycle dropout frame member for attaching a bicycle accessory to said bicycle; and,
a towing hitch structure for towing a trailer behind the bicycle formed integral to said plate and positioned between said first and second frame attachment structures.

17. A bicycle dropout frame member comprising:
a plate having a slot for receiving a bicycle wheel axle, wherein said plate spans a region between said first and second frame attachment structures, said plate spanning said region between said first and second frame attachment structures further comprising a towing hitch structure for towing a trailer behind a bicycle that itself comprises a bore for receiving a hitch pin, said bore being formed in said plate spanning said region between said first and second attachment structures, a locking channel formed through said plate from a leading edge of said plate to said bore, said locking channel allowing the insertion therethrough of a key that engages a groove formed around said hitch pin to releasably retain said hitch pin in said bore; and, a first and a second frame attachment structure, each of said frame attachment structures extending from said plate for securing said plate to a frame of a bicycle.

18. A bicycle dropout frame member comprising:

a plate having a slot for receiving a bicycle wheel axle;

a first and a second frame attachment structure, each of said frame attachment structures extending from said plate for securing said plate to a frame of a bicycle; and, an accessory mounting post extending from said plate of said bicycle dropout frame member for attaching a bicycle accessory to said bicycle, said mounting post being further constructed and arranged to receive and retain thereover an accessory leg, said mounting post having a shoulder formed around the base thereof so as to limit the insertioen said first and second frame attachment structures and wherein the towing hitch structure itself comprises a bore for receiving the tow hitch pin formed in said plate in said region between said first and second attachment structures and a locking channel that is formed through said plate from a leading edge of said plate to said bore, said locking channel allowing the insertion therethrough of a key that engages a groove formed around said hitch pin to releasably retain said hitch pin in said bore.

19. A bicycle tow hitch pin having a distal end that is constructed and arranged to be releasably secured to a dropout of a frame of a bicycle by a towing hitch structure that is formed integral with a plate having a slot for receiving a bicycle wheel axle, the plate further comprising a first and a second frame attachment structure, each of said frame attachment structures extending from said plate for securing said plate to a bicycle frame, said plate spanning the region between said first and second frame attachment structures and wherein the towing hitch structure itself comprises a bore for receiving the tow hitch pin formed in said plate in said region between said first and second attachment structures and a locking channel that is formed through said plate from a leading edge of said plate to said bore, said locking channel allowing the insertion therethrough of a key that engages a groove formed around said hitch pin to releasably retain said hitch pin in said bore.

* * * * *

UNITED STATES PATENT AND TRADEMARK OFFICE
CERTIFICATE OF CORRECTION

PATENT NO.    : 6,554,307 B1                                                    Page 1 of 1
DATED         : April 29, 2003
INVENTOR(S)   : Lynn M. Ockenden It is certified that error appears in the above-identified patent and that said Letters Patent is hereby corrected as shown below:

Column 20,
Line 19, after the first occurrence of the word "itself" please insert a period -- . --;
Line 63, delete "he" and insert therefor -- the --;

Column 29,
Line 23, delete ""insertioen said first and second frame attachment structures and wherein the towing hitch structure itself comprises a bore for receiving the tow hitch pin formed in said plate in said region between said first and second attachment structures and a locking channel that is formed through said plate from a leading edge of said plate to said bore, said locking channel allowing the insertion therethrough of a key that engages a groove formed around said hitch pin to releasably retain said hitch pin in said bore." and insert therefor -- insertion of said mounting post into a mating cavity in the end of said accessory leg. --

Signed and Sealed this

Ninth Day of September, 2003

JAMES E. ROGAN
*Director of the United States Patent and Trademark Office*